US012240175B2

(12) United States Patent
Healey

(10) Patent No.: US 12,240,175 B2
(45) Date of Patent: Mar. 4, 2025

(54) DOCKING ARRANGEMENT FOR AN ADDITIVE MANUFACTURING PROCESS

(71) Applicant: LPW Technology Ltd, Widnes (GB)

(72) Inventor: Callum Healey, Widnes (GB)

(73) Assignee: LPW Technology Ltd, Widnes (GB)

( * ) Notice: Subject to any disclaimer, the term of this patent is extended or adjusted under 35 U.S.C. 154(b) by 308 days.

(21) Appl. No.: 17/765,810

(22) PCT Filed: Sep. 29, 2020

(86) PCT No.: PCT/GB2020/052356
§ 371 (c)(1),
(2) Date: Mar. 31, 2022

(87) PCT Pub. No.: WO2021/064363
PCT Pub. Date: Apr. 8, 2021

(65) Prior Publication Data
US 2022/0371279 A1 Nov. 24, 2022

(30) Foreign Application Priority Data

Oct. 2, 2019 (GB) .................................. 1914251

(51) Int. Cl.
*B29C 64/329* (2017.01)
*B22F 12/52* (2021.01)
(Continued)

(52) U.S. Cl.
CPC ............ *B29C 64/329* (2017.08); *B22F 12/52* (2021.01); *B33Y 30/00* (2014.12); *B33Y 40/00* (2014.12)

(58) Field of Classification Search
None
See application file for complete search history.

(56) References Cited

U.S. PATENT DOCUMENTS

2007/0215825 A1\* 9/2007 Madden ................. F16K 31/05
251/129.03
2014/0264111 A1 9/2014 Porter
(Continued)

FOREIGN PATENT DOCUMENTS

DE 102013005458 A1 10/2014
EP 2052845 A2 4/2009
(Continued)

OTHER PUBLICATIONS

International Search Report and Written Opinion for PCT/GB2020/052356 dated Nov. 17, 2020; 14 pages.

*Primary Examiner* — Robert J Grun
(74) *Attorney, Agent, or Firm* — Schwabe, Williamson & Wyatt, P.C.

(57) ABSTRACT

A Docking Arrangement for an Additive Manufacturing Process An operating handle (50) for controlling the operational state of a valve arrangement (26) associated with a container (12) to control dispensing of material from the container (12) to a component of an additive manufacturing process. The operating handle (50) includes a rotatable shaft 56 which is coupled to the valve arrangement (26) and is rotatable between a plurality of angular positions corresponding one or more operational states of the valve arrangement (26). A lever (52) is operatively coupled to the shaft (56) and is configured to cause rotation of the shaft (56) between the plurality of angular positions upon rotation of the lever (52). The handle (50) is also rotatable under the operation of an actuator (40) provided as part of a docking arrangement (10) associated with the component.

23 Claims, 15 Drawing Sheets

(51) Int. Cl.
*B33Y 30/00* (2015.01)
*B33Y 40/00* (2020.01)

(56) References Cited

U.S. PATENT DOCUMENTS

2015/0053881 A1 2/2015 Miura
2017/0016548 A1 1/2017 Jackson
2021/0162507 A1* 6/2021 Eyermann .............. B33Y 40/00

FOREIGN PATENT DOCUMENTS

EP 2833041 A2 2/2015
FR 3074484 A1 6/2019

* cited by examiner

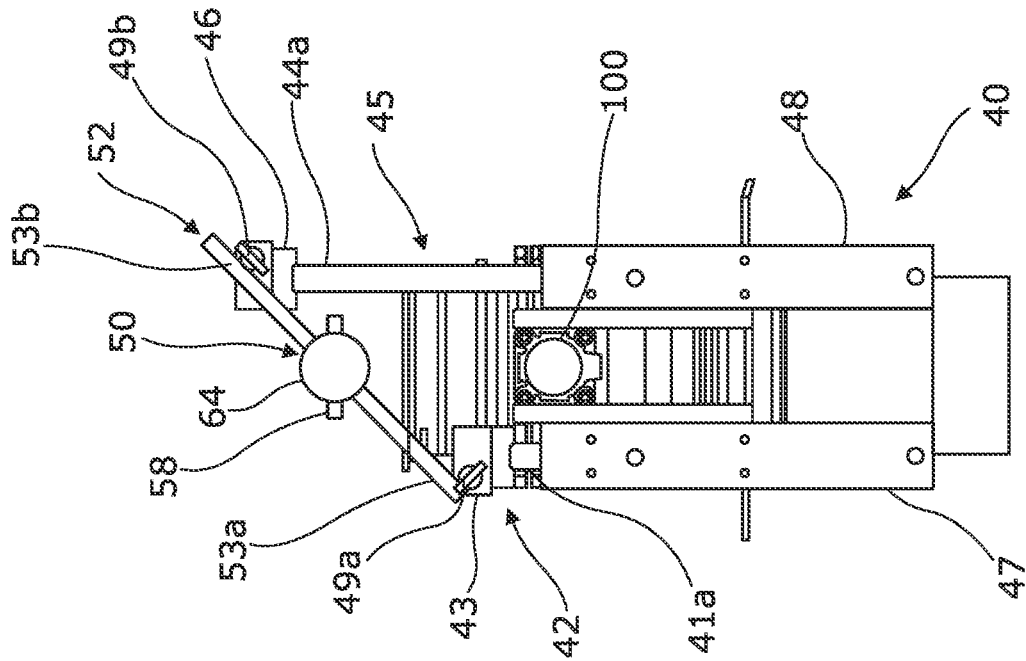
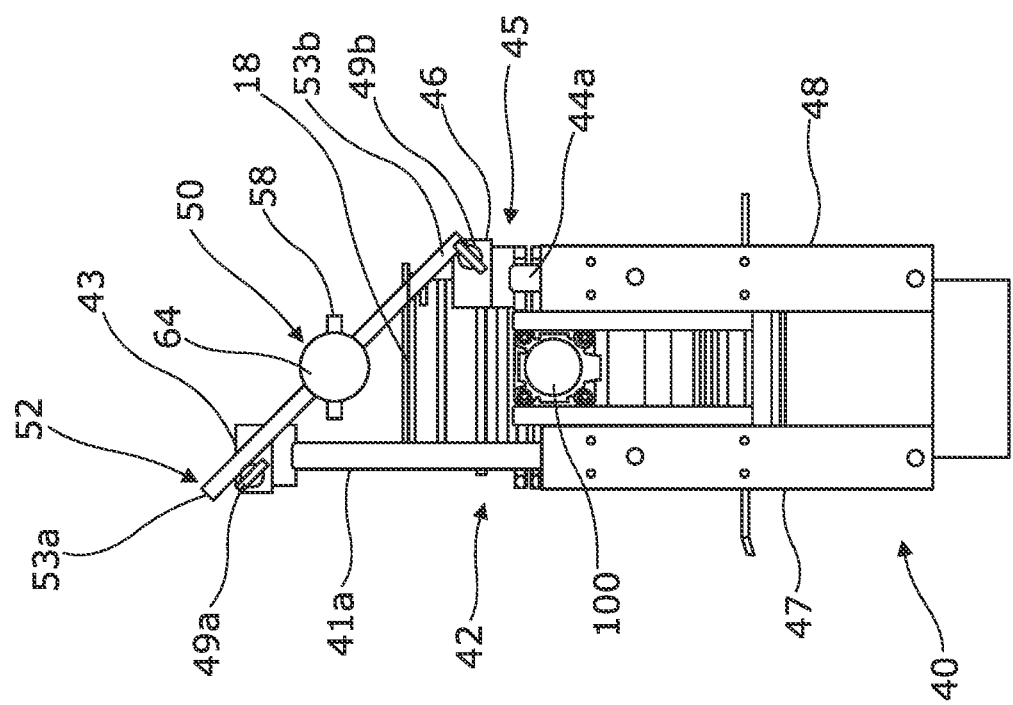
Fig. 7A
Fig. 7B

DOCKING ARRANGEMENT FOR AN ADDITIVE MANUFACTURING PROCESS

CROSS-REFERENCE TO RELATED APPLICATION

The present application is a national phase entry under 35 U.S.C. § 371 of International Application No. PCT/US2020/052356, filed Sep. 29, 2020, which designates the United States of America, which claims priority to GB Application No. 1914251.2, filed Oct. 2, 2019, the entire disclosures of each of these applications are hereby incorporated by reference in their entireties and for all purposes.

TECHNICAL FIELD OF THE INVENTION

The present invention relates to a docking arrangement, and specifically to a docking arrangement for use in an additive manufacturing process for supplying material such as powders held within containers (e.g. hoppers) to additive manufacturing machines.

BACKGROUND TO THE INVENTION

Additive manufacturing generally relates to the process of manufacturing 3D objects by building up layers of a material or materials. Conventionally, the materials may be supplied to additive manufacturing machines in the form of powders (e.g. metal powders). For small scale manufacturing processes the powders may be supplied in containers (e.g. plastic jars). For larger scale processes, hoppers have been designed for transporting large amounts of powder and delivery to additive manufacturing machines. Such hoppers have been refined to ensure environmental conditions within the hopper (e.g. atmosphere, moisture, etc.) are kept under control. For example, some powders may oxidise in air so must be kept under a controlled atmosphere. Further, it is desirable in most cases to prevent the powder getting wet and this may lead to issues in delivering that powder to the additive manufacturing machines—i.e. it may prevent flow of the powder out of the hopper. However, to date, no complete solution has been provided.

For example, there is a need for a docking arrangement where a hopper containing a material (e.g. a powder) for a manufacturing process may be docked and coupled to a component of an additive manufacturing process (e.g. an additive manufacturing machine) for delivering the powder from the hopper to the component.

There is a need to provide an arrangement whereby dispensing of the material from the hopper can be controlled, e.g. automatically and/or manually, as the situation requires. For example, in general, the dispensing of material from the hopper is gravity fed and with large scale processes this can lead to manual control being unsuitable—e.g. out of reach. It would therefore be advantageous to provide an arrangement where the dispensing of material from the hopper can be controlled without an operator having to physically interact with the hopper, e.g. to open an outlet of the hopper.

There is a need to provide an arrangement whereby the hopper may be suitably secured to the component. This may be necessary to ensure that the coupling between the hopper and the component is stable and/or ensuring that any necessary environmental controls are maintained—e.g. air/water tight seal provided at the coupling between the hopper and the component. It may also be necessary to ensure that the coupling between the hopper and the component remains secured in place during dispensing of the material.

It is therefore an aim of an embodiment or embodiments of the invention to overcome or at least partially mitigate one or more problems associated with the prior art.

SUMMARY OF THE INVENTION

According to a first aspect of the invention there is provided an operating handle for controlling the operational state of a valve arrangement associated with a container to control dispensing of material from the container to a component of an additive manufacturing process, the operating handle comprising: a rotatable shaft coupled to the valve arrangement, the shaft being rotatable between a plurality of angular positions corresponding one or more operational states of the valve arrangement; and a lever operatively coupled to the shaft and configured to cause rotation of the shaft between the plurality of angular positions upon rotation of the lever; wherein the lever is rotatable under the operation of an actuator provided as part of a docking arrangement associated with the component.

Advantageously, the operating handle may be acted on either manually or automatically via the actuator. The lever may be rotatable under the operation of the actuator.

The lever may be fixed to or integrally formed with the rotatable shaft. In embodiments, the lever may be operatively coupled to the rotatable shaft via a coupling portion. The coupling portion may be provided approximately half way along the length of the lever. Accordingly, in such embodiments the position of the coupling portion may define first and second lever arms of the lever provided either side of the coupling portion. In other embodiments, the lever is operatively coupled to the rotatable shaft at or proximal to an end of the lever.

In embodiments, the lever (and hence the rotatable shaft) may be rotatable between first and second rotational positions. The first and second rotational positions may correspond to a fully closed and fully open configuration of the associated valve arrangement. The lever may be rotatable between first and second rotational positions via an intermediate position provided between the first and second rotational positions. The intermediate position may correspond to a partly open configuration of the valve arrangement. Accordingly, the intermediate position of the lever may allow for the flow of material from the container to be controlled.

The rotatable shaft may be coupled to the valve arrangement via a coupling means. The coupling means may be provided at an end of the rotatable shaft. In embodiments, the coupling means comprises a female coupling, e.g. a bore, within the end of the shaft configured to receive a corresponding operating shaft of the valve arrangement. Further fixing means may be provided for fixing and securing the operating handle to the valve arrangement, in use.

In embodiments, the rotatable shaft includes first and second shaft portions. The first shaft portion may be coupled to the lever thereby providing the operative coupling between the lever and the rotatable shaft. The second shaft portion may be coupled, in use, to the valve arrangement.

The first and second shaft portions may be operatively coupled. In embodiments, the first and second shaft portions may be coupled via one or more rods. The one or more rods may be located in corresponding slots provided within the first and second shaft. In use, the rods may provide an interface between the first and second shaft portions ensuring that the second shaft portion rotates upon rotation of the first shaft portion—e.g. upon rotation of the lever which may be under operation of an actuator or manual rotation by a user.

The rotatable shaft (or at least a component thereof) may be moveable in an axial direction. In embodiments, the rotatable shaft (or component thereof) may be moveable in an axial direction under the operation of the lever.

In some embodiments, the first and/or second shaft portion may be moveable in an axial direction. In presently preferred embodiments the first shaft portion is moveable in an axial direction between first and second axial positions under the operation of the lever. Specifically, the first shaft portion may be moveable in an axial direction upon linear movement of the lever. In such embodiments, the position of the second shaft portion may be fixed in an axial direction. This may be necessary to ensure that the rotatable shaft remains coupled with the valve arrangement, e.g. via coupling means provided on or by the second shaft portion, irrespective of the axial position of the rotatable shaft, specifically the first shaft portion of the rotatable shaft.

In some embodiments the operating handle comprises a biasing member. The biasing member may comprise a spring. The biasing member may be configured to provide a biasing force which acts with or against movement of one or more components of the operating handle—e.g. the rotatable shaft or lever—in one or more directions. In some embodiments the biasing member may be configured to provide a biasing force which acts with or against axial movement of the rotatable shaft.

In embodiments, the first and second shaft portions may be operatively coupled via the biasing member. Accordingly, in such embodiments, the biasing member may be configured to provide a biasing force which acts with or against movement of the first shaft portion relative to the second shaft portion.

In embodiments the biasing force provided by the biasing member acts against movement of the first shaft portion from a first axial position to a second axial position, and with movement of the first shaft portion from the second axial position to the first axial position. In this way, the biasing force may acts to urge/retain the first shaft portion in its first axial position unless acted on.

In embodiments, the operating handle comprises a rotation retention mechanism. The rotation retention mechanism may be configured to retain the lever and hence the rotatable shaft in one of a plurality of rotational positions as may be required.

In embodiments, the rotation retention mechanism may be configured to retain the lever and rotatable shaft in given rotational position when the rotatable shaft (or a component thereof) is in a first axial position. Similarly, the rotation retention mechanism may be configured to allow rotation of the lever and rotatable shaft between a plurality of rotational positions when the rotatable shaft (or a component thereof) is in a second axial position. Accordingly, in use, movement of the rotatable shaft (or a component thereof) from its first axial position to its second axial position may disengage the rotation retention mechanism. Similarly, movement of the rotatable shaft (or a component thereof) from its second axial position to its first axial position (e.g. under the operation of a biasing member) may engage the rotation retention mechanism. In this way, the operating handle may be configured such that the rotation retention mechanism is engaged unless the lever is moved linearly (e.g. manually or via an actuator) to cause axial movement of the rotatable shaft.

In embodiments, the rotation retention mechanism comprises a slot provided within an outer sheath provided about the rotatable shaft. In such embodiments, the slot may be configured to receive a projecting portion associated with the rotatable shaft. The operating handle may be configured such that the projecting portion is configured to move along the slot in the outer sheath upon rotation of the rotatable shaft, e.g. through rotation of the lever.

In embodiments, the slot in the outer sheath comprises a plurality of notches for receiving the projecting portion. The plurality of notches may be configured to act to prevent rotation of the shaft by retaining the projecting portion therein. In effect, the plurality of notches may define a plurality of angular positions in which the rotatable shaft and hence lever may be retained. The plurality of notches may consist of three notches corresponding to the first, intermediate and second rotational positions of the lever. Accordingly, the plurality of notches may correspond to three operational states of the valve arrangement—e.g. a fully closed, an intermediate/partly open and a fully open state for controlling flow of the manufacturing material from the container.

In embodiments, the operating handle may be configured such that the lever may be acted on directly by one or more components of an associated actuator. For example, in embodiments wherein the lever comprises first and second lever arms, each of the lever arms may be configured, in use, to be acted on by respective components of the actuator to cause rotation of the lever.

In some embodiments, the operating handle may comprise coupling means for coupling the operating handle to the actuator, in use. The coupling means may comprise a female coupling, e.g. a bore, provided by a component of the operating handle for receiving a corresponding male coupling provided by the actuator. The coupling means may be provided on or by the lever. In some embodiments the coupling means are provided on or by the coupling portion of the lever.

In embodiments, the operating handle may comprise a right angle drive type arrangement. In such embodiments, the operating handle may be configured to be coupled with and acted on by an actuator which has an operational axis oriented different (e.g. perpendicular) to the operating handle. For example, in some embodiments the operating handle may comprise a right angle drive type arrangement configured to receive a vertically oriented actuator (for example a vertical actuator drive shaft). The operating handle may include a gear arrangement, which in embodiments may include a pair of bevel gears, to effect corresponding rotation of a differently oriented (e.g. horizontally oriented) drive shaft of the valve arrangement (via the rotatable shaft of the operating handle) under operation/rotation of the actuator.

In embodiments, the operating handle may be specific to a type of material held within the container. For example, in embodiments wherein the operating handle includes a coupling means in the form of a bore, the bore may include a configuration which is specific to the type of material held within the container. Accordingly, in such embodiments, a specifically configured actuator must be used to act on the operating handle in order to open and close the associated valve arrangement. In this way, the operating handle may be configured to prevent the wrong type of material being deposited at the wrong location or to the wrong component of an additive manufacturing process.

According to a second aspect of the invention there is provided an actuator for controlling the operational state of a valve arrangement associated with a container to control dispensing of material from the container to a component of an additive manufacturing process, wherein: the actuator is provided as part of a docking arrangement associated with the component; the actuator comprises at least one moveable component configured to be coupled with an operating handle of the first aspect of the invention; and the at least one moveable component is operable, in use, to cause rotation of the lever to control the operational state of the valve arrangement.

The moveable component may be configured to be coupled to a lever of an operating handle of the first aspect of the invention.

In embodiments, the at least one moveable component comprises a linear actuator, this may include a piston. The piston may be moveable between a plurality of positions to cause rotation of the lever.

In use, the actuator may be configured to move linearly between a first position and a second position. Movement of the actuator between first and second positions may cause corresponding movement of the lever between its first and second rotational positions.

In embodiments, the actuator may be configured to move linearly between a retracted position and the first position. The actuator may be configured such that, in use, in moving from a retracted position to a first position, the actuator is brought into contact with at least a portion of the lever.

In some embodiments the actuator comprises an end portion forming a contact surface for contacting the lever to cause rotation thereof. In embodiments, the end portion may comprise a roller wherein the contact surface is a rotatable about a central axis. In such embodiments, the roller may be configured, in use, to cause linear movement of the lever when the roller is brought into contact with the lever—e.g. upon moving the actuator from its retracted position to its first position. In this way, the end portion of the actuator may be configured, in use, to disengage a rotation retention mechanism associated with the lever when brought into contact with the lever.

The end portion of the actuator may be configured such that, upon movement of the actuator from its first position to its second position (and corresponding rotation of the lever), a contact surface of the end portion may be brought out of contact with the lever. In use, this configuration may be such that the rotation retention mechanism associated with the lever may be re-engaged upon movement of the piston from its first to its second position. In embodiments, the contact surface of the end portion of the actuator may be angled with respect to the lever. For example, with the actuator in its first position and the lever in its first rotational position, the contact surface of the end portion of the lever may be positioned perpendicular to the longitudinal axis of the lever. Further, with the actuator in its second position and the lever in its second rotational position, the contact surface may be positioned parallel to the longitudinal axis of the lever.

In some embodiments, the actuator may comprise a pair of linear actuators. Each actuator of the pair may be configured in the same way as the actuator described above. In use, each actuator may be configured to act on respective lever arms of the lever to cause rotation of the lever.

In some embodiments the at least one moveable component of the actuator comprises a drive shaft. The drive shaft may be rotatable. The drive shaft may be configured as a male coupling part to be received in a corresponding female coupling provided by the operating handle or vice versa. For example, the drive shaft may be configured to be received within a female coupling in the form of a bore provided within or by a component of the operating handle—e.g. the lever. The drive shaft may be moveable in an axial direction to cause linear movement of the lever as may be required—e.g. to disengage/engage a rotation retention mechanism.

In some embodiments operation of the actuator may be controllable via a control system. For example, in embodiments a control system may be provided for controlling movement of the at least one moveable component of the actuator.

The control system may be configured to account for the operational state of one or more components of an associated docking arrangement when controlling movement of the (or each) moveable component. For example, in some embodiments the control system may be configured to account for the operational state of a locking mechanism associated with the container when controlling movement of the at least one moveable component. The control system may be configured to require that locking mechanism be in a locked state before moving the at least one moveable component to actuate dispensing of the material from the container.

According to a third aspect of the invention there is provided a docking arrangement for an additive manufacturing process, the docking arrangement comprising an operating handle according to the first aspect of the invention and an actuator according to the second aspect of the invention.

According to a fourth aspect of the invention there is provided a method of controlling the operational state of a valve arrangement associated with a container to control dispensing of material from the container to a component of an additive manufacturing process using a docking arrangement of according to the third aspect of the invention, the method comprising: coupling an outlet of the container to an inlet of a dock associated with the component of the additive manufacturing process; and rotating the lever under the operation of the actuator to open the valve arrangement to dispense material from the container to the component.

DETAILED DESCRIPTION OF THE INVENTION

In order that the invention may be more clearly understood one or more embodiments thereof will now be described, by way of example only, with reference to the accompanying drawings, of which:

FIG. 7A is a side view of the operating handle shown in FIG. 6 in one state;

FIG. 7B is a side view of the operating handle shown in FIG. 6 in another state;

Figure 14A:
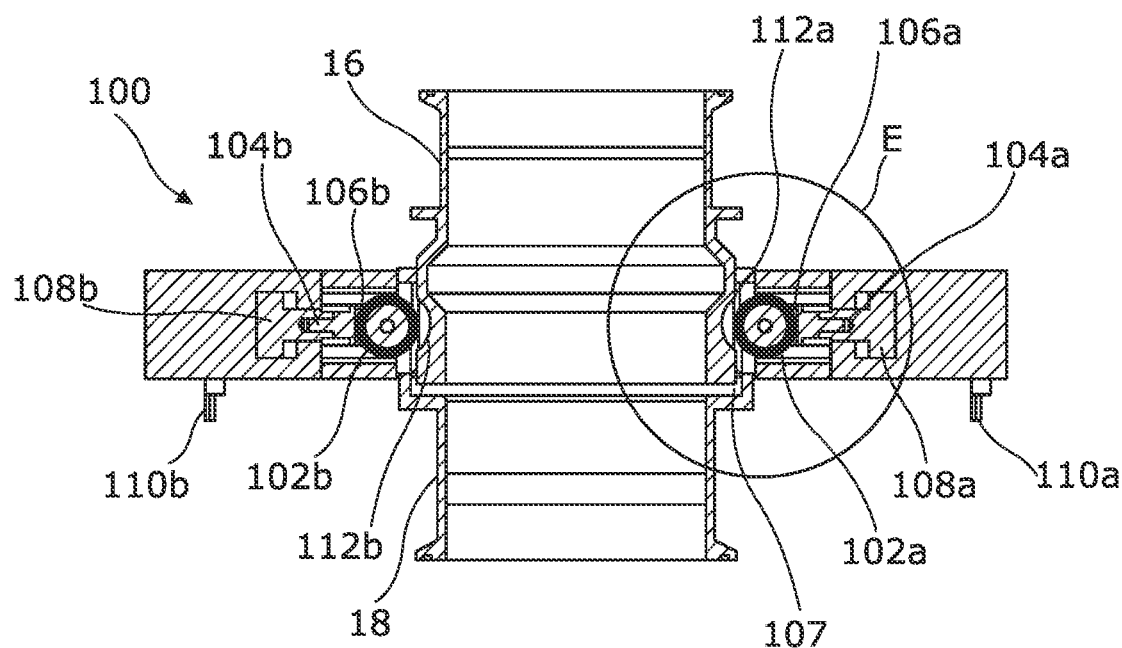
FIG. 14A is a cross-sectional view of the locking mechanism of FIGS. 12 and 13 in one state.
Figure 15A:
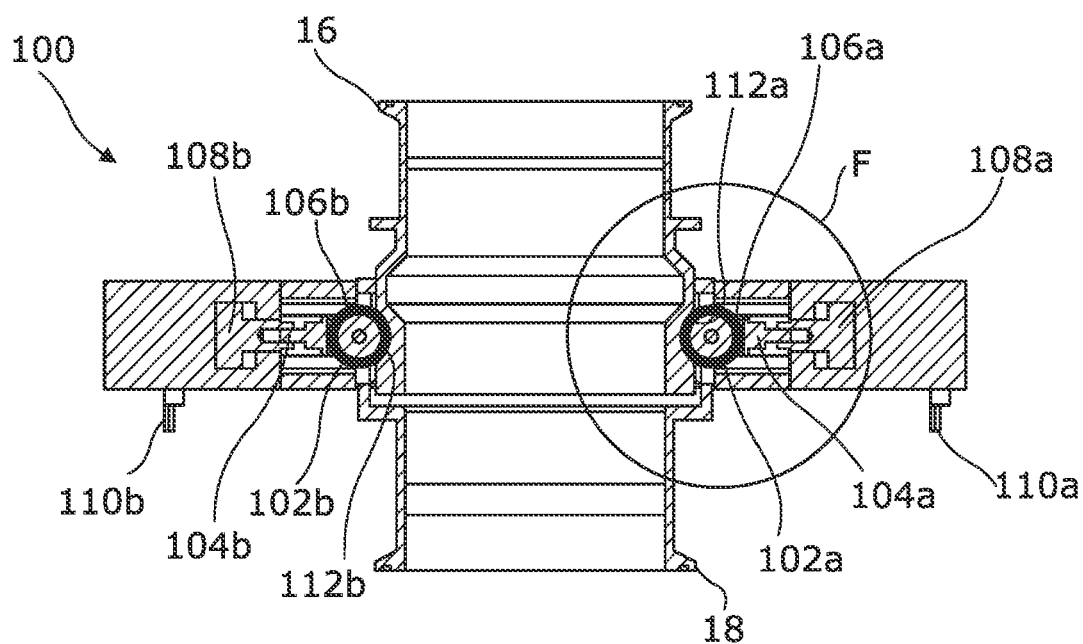
Figure 15B:
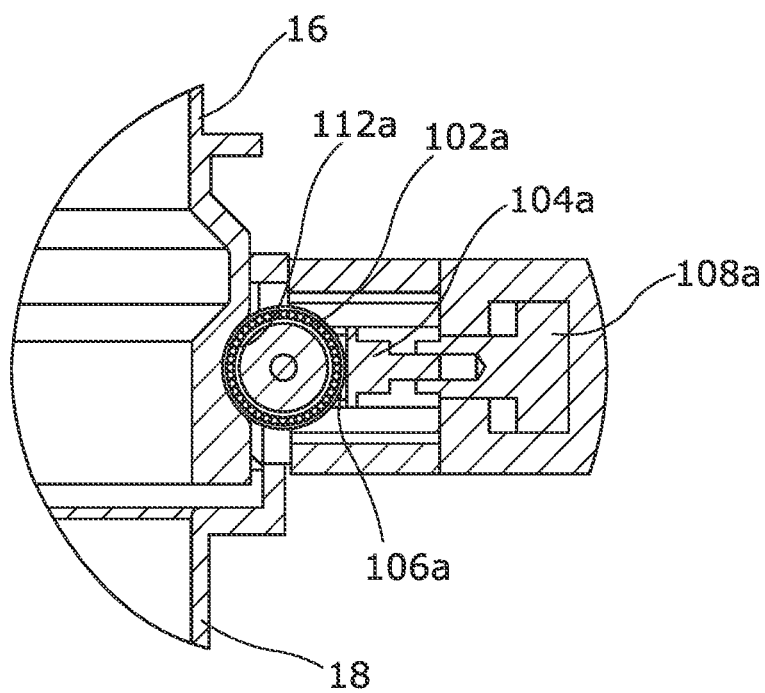
Figure 16:
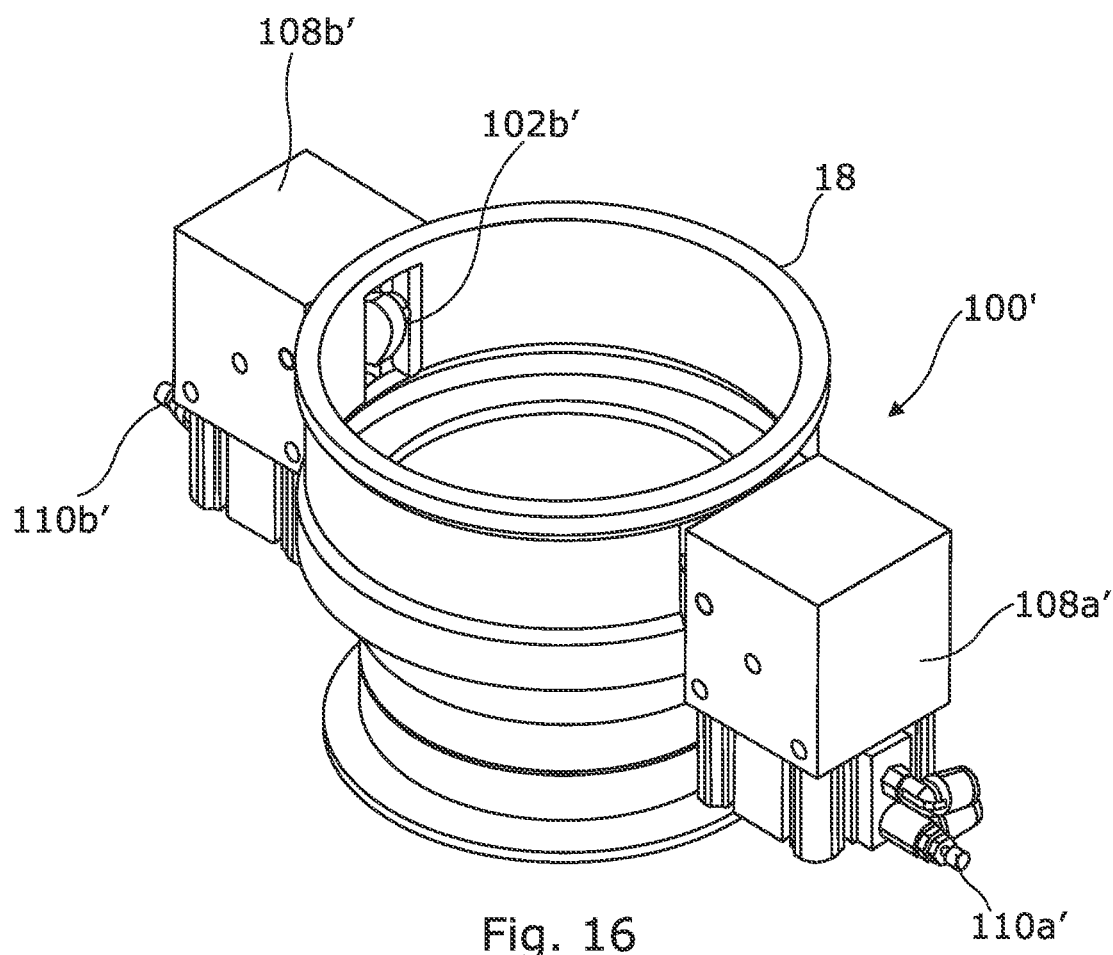
Figure 17:
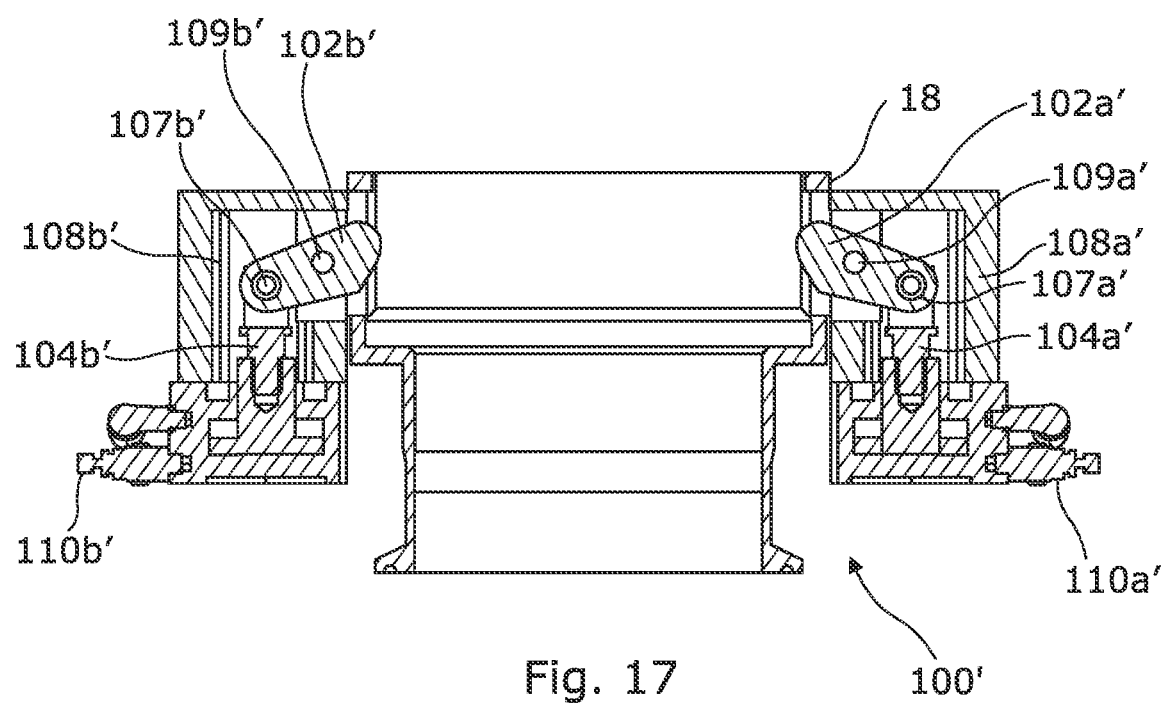
Figure 18A:
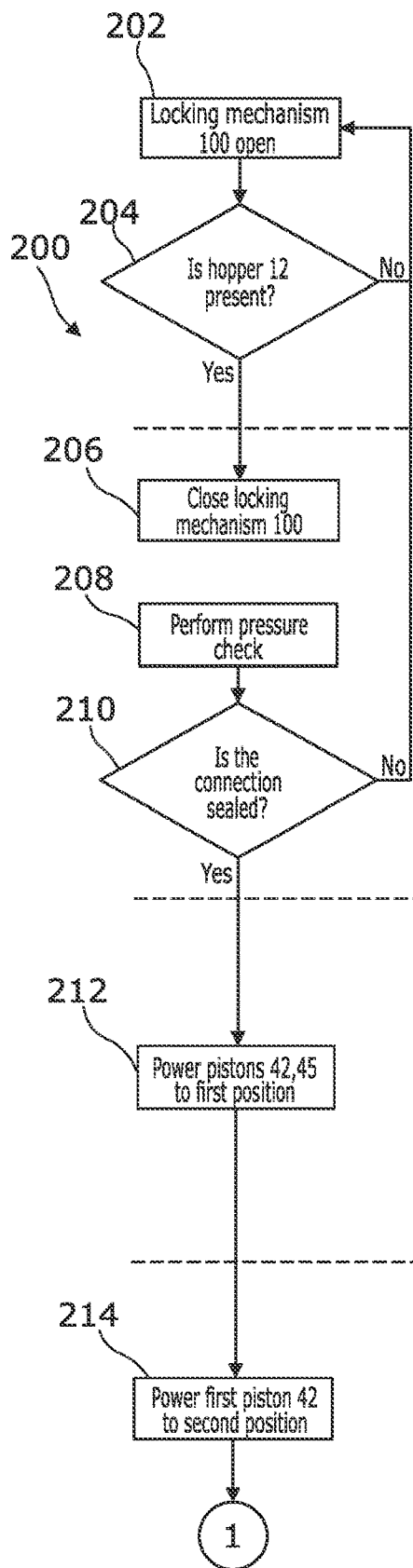
Figure 18A:
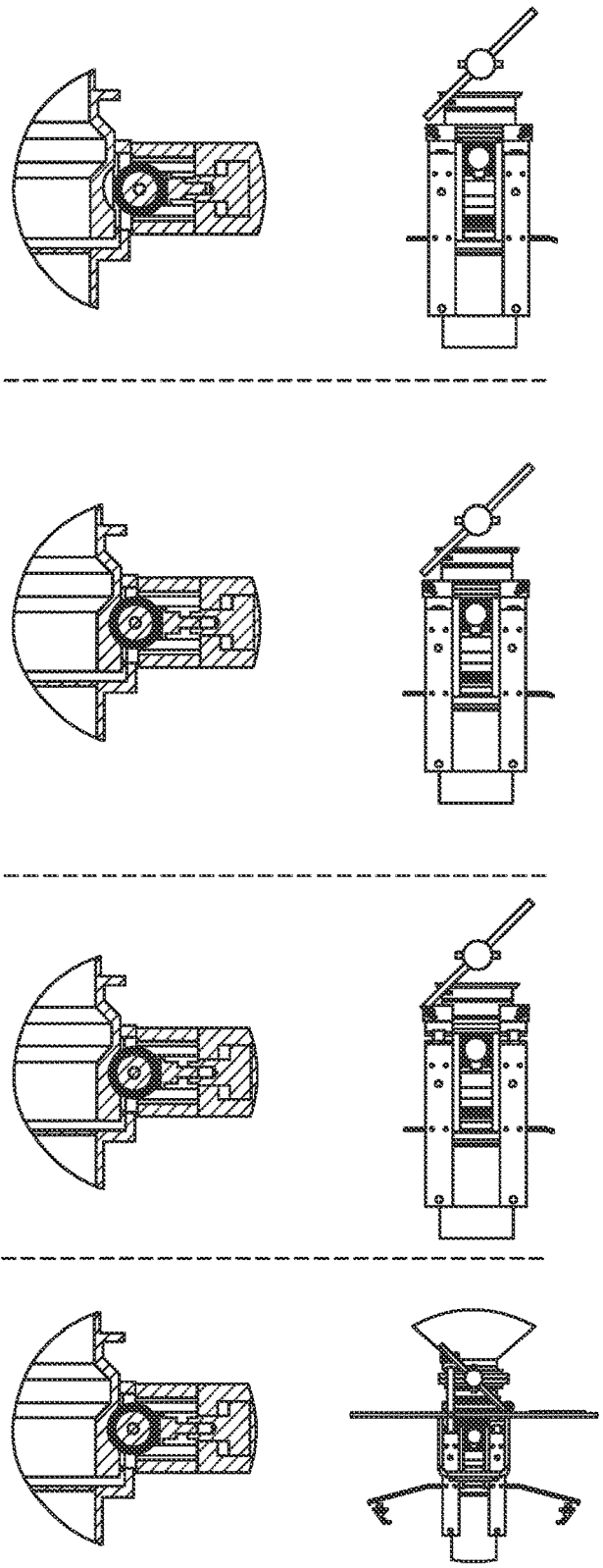
Figure 18B:
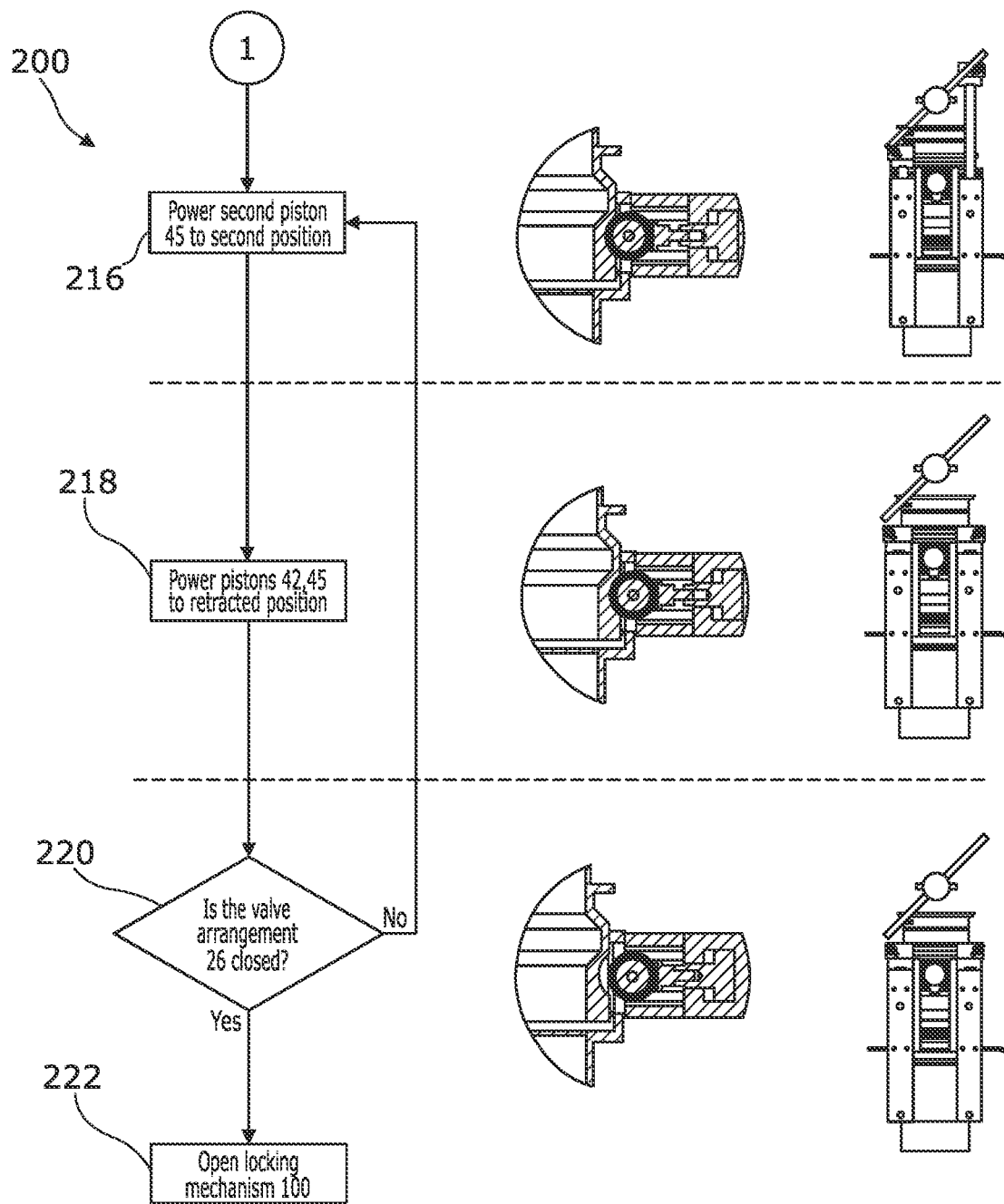
Figure 19:
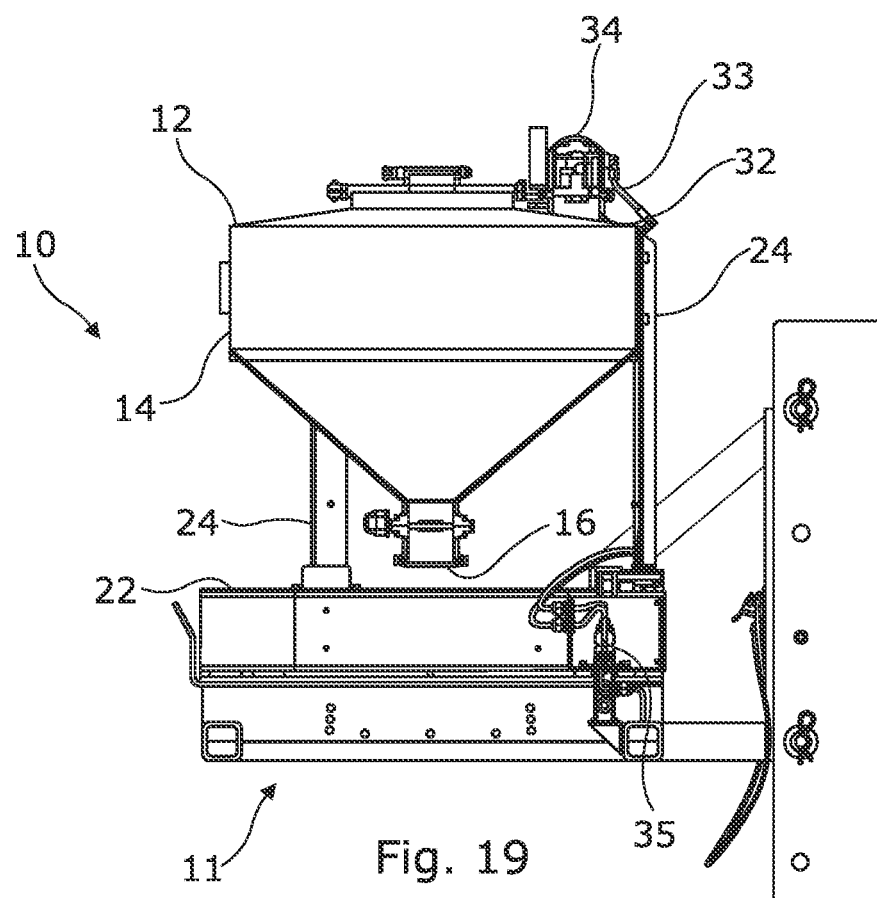
Figure 20:
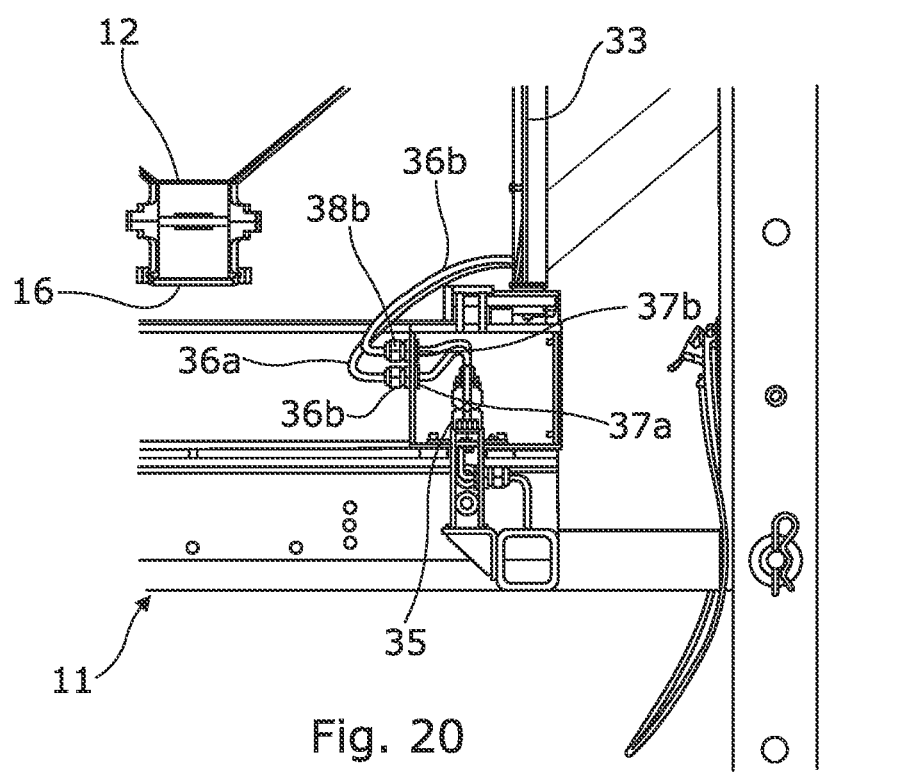

FIG. 15A corresponds to FIG. 14A with the locking mechanism in another state;

FIG. 15B is an enlargement of region F of FIG. 15A;

FIG. 16 is a perspective view of a further embodiment of a locking mechanism;

FIG. 17 is a cross-sectional view of the locking mechanism of FIG. 16;

FIG. 18A is a flowchart illustrating a control strategy for operating the docking arrangement described herein;

FIG. 18B is a continuation of the control strategy of FIG. 18A;

FIG. 19 is a side cross sectional view illustrating a further feature of the docking arrangement of the preceding Figures; and FIG. 20 is a further side cross sectional view of the docking arrangement.

The present invention relates to a docking arrangement 10 for a manufacturing process such as an additive manufacturing process.

Figure 1:
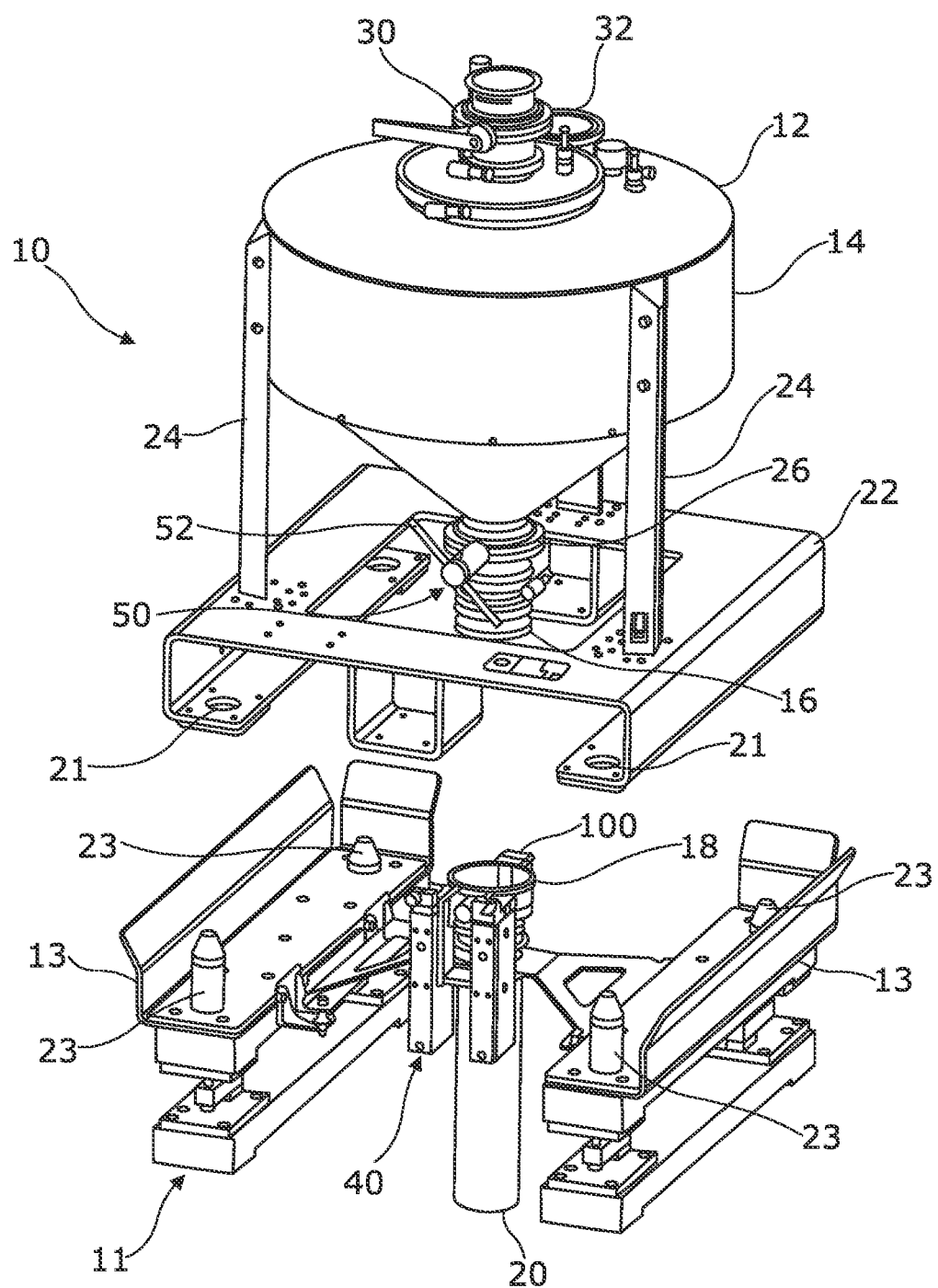
FIG. 1 is a perspective view of a docking arrangement.
Figure 2:
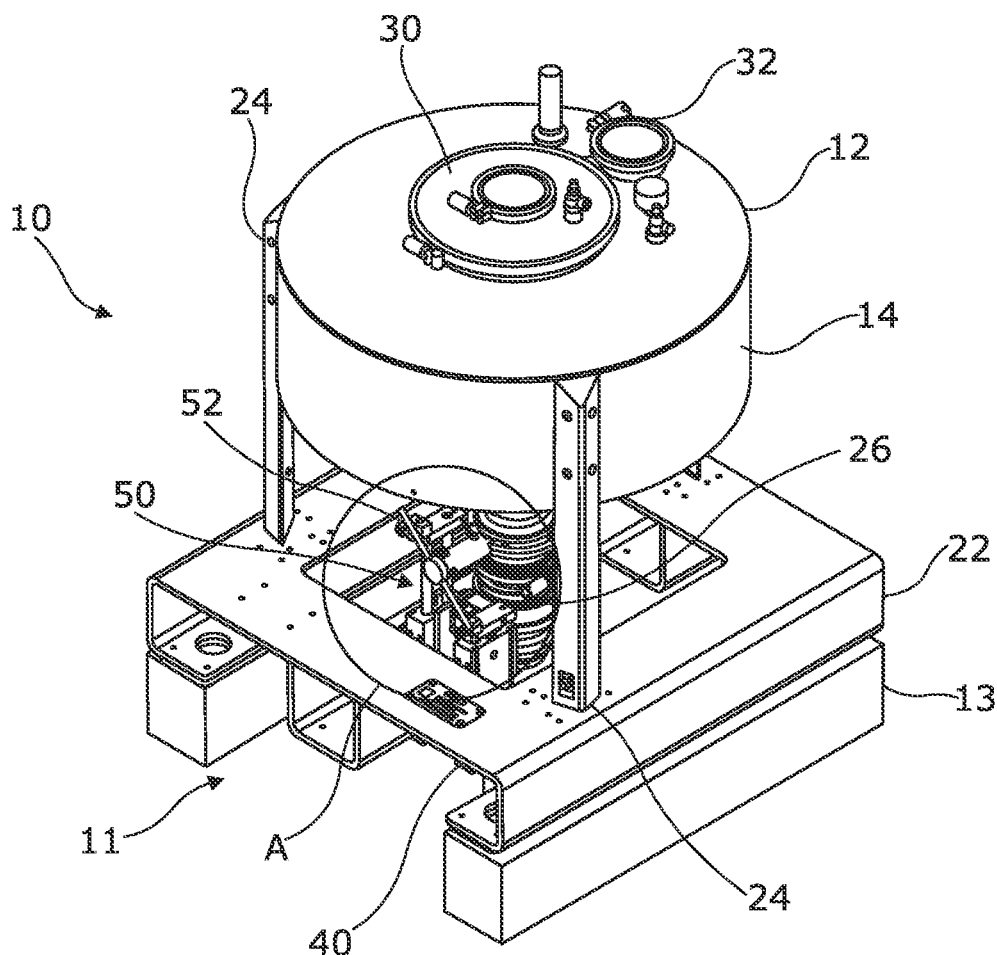
FIG. 2 is a perspective view of the docking arrangement of FIG. 1.
Figure 3:
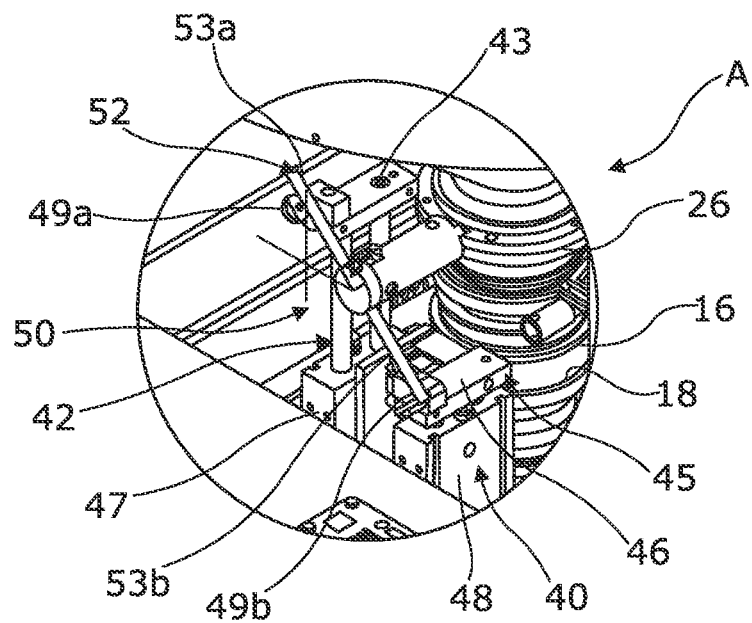
FIG. 3 is an enlarged view of region A of FIG. 2.
Figure 4:
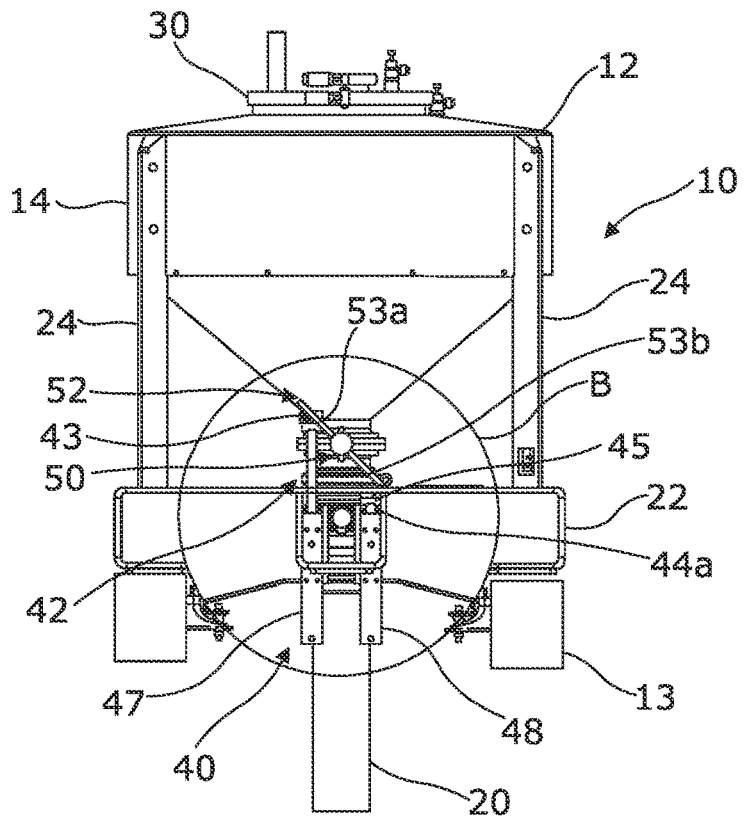
FIG. 4 is a side cross-sectional view of the docking arrangement shown in the preceding Figures.
Figure 5:
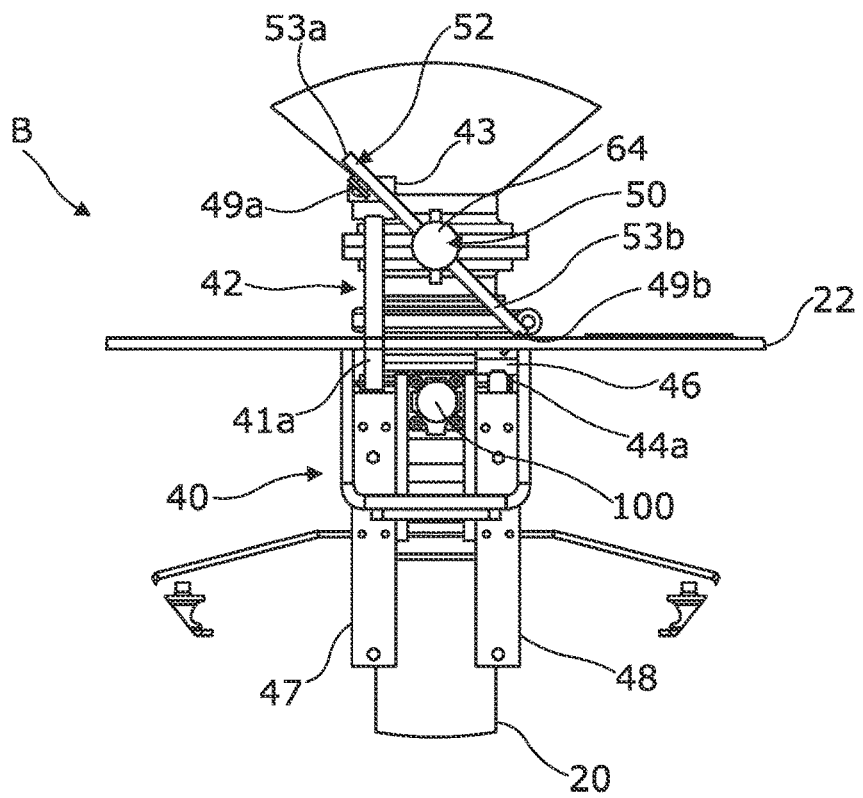
FIG. 5 is an enlarged view of section B of FIG. 4.

Referring to FIGS. 1 and 2, the docking arrangement 10 includes a dock 11 to which a container in the form of hopper 12 may be coupled. These Figures show the hopper 12 undocked from and docked to the dock 11, respectively. In use, the dock 11 may correspond to a machine of an additive manufacturing process and the hopper 12 may contain powder (such as metal powder) to be supplied to that machine.

The hopper 12 includes a stand 22 and supporting arms 24 for supporting a container 14 of the hopper 12 on the stand 22. In the illustrated embodiment, three supporting arms 24 are provided. The container 14 may include powder for the additive manufacturing process. The container comprises an upper cylindrical portion above a frustroconical portion, leading to an outlet.

The hopper 12 includes an outlet 16 which may be coupled and secured to an inlet 18 on the dock 11. The coupling between the outlet 16 of the hopper 12 and the inlet 18 includes a locking mechanism 100. As is described in detail herein, the locking mechanism 100 comprises means to lock and secure the outlet 16 and inlet 18 to allow material from the container 14 of the hopper 12 to be supplied to a further component of the manufacturing process via the dock 11. In the illustrated embodiment, the inlet 18 is provided with a conduit 20 for supplying the material from the hopper 12 to the further component of the manufacturing process.

The stand 22 of the hopper 12 includes apertures 21 in a base thereof for receiving corresponding projecting members 23 on the dock 11. As shown, the projecting members 23 project upwardly from a surface 13 of the dock 11. The coupling of the apertures 21 with respective projecting members 23 may act to further secure the hopper 12 to the dock 11, in use.

The hopper 12 is provided with a valve arrangement 26 for controlling flow of material out of the container 14 of the hopper 12. In presently preferred embodiments the valve arrangement comprises an outlet valve in the form of a butterfly valve, however, it will be appreciated that the invention is not limited in this sense and the valve arrangement 26 can comprise any suitable valve type. In the illustrated embodiment, the outlet valve is controlled via an operating handle 50. As is described herein, operating handle 50 may be used to open and/or close the outlet valve of the valve arrangement 26 through rotation of a lever 52 of the operating handle 50, which may be effected in embodiments via an actuator 40 operatively coupled with the operating handle 50. In the illustrated embodiment, the actuator 40 forms part of the dock 11 and is positioned such that, upon docking of the hopper 12 on the dock 11, the operating handle 50 and actuator 40 are positioned relative to one another for subsequent actuation of the operating handle 50.

The hopper 12 is additionally provided with a gas inlet 32. As described with reference to FIGS. 19 and 20, in use, the gas inlet 32 may be used to control a pressure level inside the container 14 of the hopper 12. For example, it may be desirable to increase the pressure within the hopper 12 to aid flow of the material from the outlet 16.

As discussed herein, the docking arrangement 10 includes a dock 11 which may correspond (or form part of) to a machine of an additive manufacturing process (such as, for example, an additive manufacturing machine or a sieve) and the hopper 12 may contain powder to be supplied to that machine. However, in some instances it may be desirable for powder/material to be delivered to the hopper 12—e.g. to replenish the material therein. Accordingly, the hopper 12 is provided with an openable hatch 30 in an upper surface providing access to the interior of the container 14 of the hopper 12. In some instances, material from a further hopper may be deposited into the hopper 12. In such cases, the docking arrangement 10 may be used, where the inlet 18 (and optionally conduit 20) serve as an inlet to hopper 12 and a separate hopper is docked on the dock 11. This may be useful in embodiments where materials in two different hoppers may need to be blended, or simply for replenishing the material in hopper 12. In embodiments, material from one hopper or an additive manufacturing machine may be passed through a sieve before being deposited in the hopper 12. In such instances, the docking arrangement 10 may be adapted to receive a sieve.

FIGS. 3 to 7B illustrate an embodiment of the operating handle 50 and show how the actuator 40 may be used to actuate the operating handle 50 to open and/or close the outlet valve of the valve arrangement 26.

The operating handle 50 includes a lever 52 which may be rotated between a plurality of rotational positions and a rotatable shaft 56 connected to the lever 52. As is described herein, rotation of the lever 52 causes a corresponding rotation of the shaft 56 which in turn acts on the outlet valve (not shown) to control flow of the material out of the hopper 12.

The lever 52 is coupled to (e.g. suitably fixed to or integrally formed with) rotatable shaft 56 of the operating handle 50 approximately half way along its length via an coupling portion 64 such that the lever 52 is pivoted about its centre defining first and second lever arms 53a, 53b either side of the coupling portion 64. In use, the lever 52 (and hence the rotatable shaft 56) is rotatable between two rotational positions corresponding to a fully closed and fully open configuration of the associated valve arrangement 26.

In this embodiment, the actuator 40 takes the form of a dual piston arrangement which includes a first piston 42 and second piston 45. The first and second pistons 42, 45 are moveable between a plurality of positions in order to effect rotation of the lever 52. As shown and described herein, the first piston 42 is configured to act on the first lever arm 53a, and the second piston 45 is configured to act on the second lever arm 53b to rotate said lever arms 53a, 53b as required.

The first piston 42 includes a first pair of piston arms 41a, 41b and an upper supporting member 43 to which the piston arms 41a, 41b are coupled. A first roller 49a is mounted to the supporting member 43 and positioned so as to interact, in use, with the first lever arm 53a of the lever 52. The piston arms 41a, 41b are configured, in use, to move in and out of a first piston chamber 47, for example, through a hydraulic or pneumatic arrangement introducing or removing fluid from within the piston chamber 47. Alternatively, the actuator 40 may comprise an electrical actuator such as a solenoid or motor configured to move arms 41a, 41b. In moving in and out of the first piston chamber 47, the piston arms 41a, 41b cause corresponding movement of the supporting member 43, and hence the roller 49a, to actuate movement (linear and/or rotational) of the lever 52 through interaction with the first lever arm 53a.

Similarly, the second piston 45 includes a second pair of piston arms 44a, 44b and an upper supporting member 46 to which the piston arms 44a, 44b are coupled. A second roller 49b is mounted to the supporting member 46 and positioned so as to interact, in use, with the second lever arm 53b of the lever 52. The piston arms 44a, 44b are configured, in use, to move in and out of a second piston chamber 48, for example, through a hydraulic or pneumatic arrangement introducing or removing fluid from within the piston chamber 48. Alternatively, and as described above, the actuator 40 may comprise an electrical actuator. In moving in and out of the second piston chamber 48, the piston arms 44a, 44b cause corresponding movement of the supporting member 46, and hence the roller 49b, to actuate movement (linear and/or rotational) of the lever 52 through interaction with the second lever arm 53b.

The pistons 42, 45 are configured to move linearly between a retracted position, a first position and a second position. In moving from a retracted position to a first position, the pistons 42, 45 may, depending on the rotational position of the lever 52, be brought into contact with respective lever arms 53a, 53b.

Specifically, with the lever 52 in its first rotational position, moving the first piston 42 from its retracted position to its first position brings the first roller 49a into contact with the first lever arm 53a. As discussed herein, bringing the first roller 49a into contact with the first lever arm 53a may cause linear movement of the first lever arm 53a. Subsequently moving the first piston 42 from its first position to its second position acts on the first lever arm 53a to rotate the lever 52 from its first rotational position to its second rotational position. As is described herein, this may act to open the valve arrangement 26.

Similarly, with the lever 52 in its second rotational position, moving the second piston 45 from its retracted position to its first position brings the second roller 49b into contact with the second lever arm 53b. As discussed herein, bringing the second roller 49b into contact with the second lever arm 53b may cause linear movement of the second lever arm 53b. Subsequently moving the second piston 45 from its first position to its second position acts on the second lever arm 53b to rotate the lever 52 from its second rotational position to its first rotational position. This may act to close the valve arrangement 26.

Figure 6:
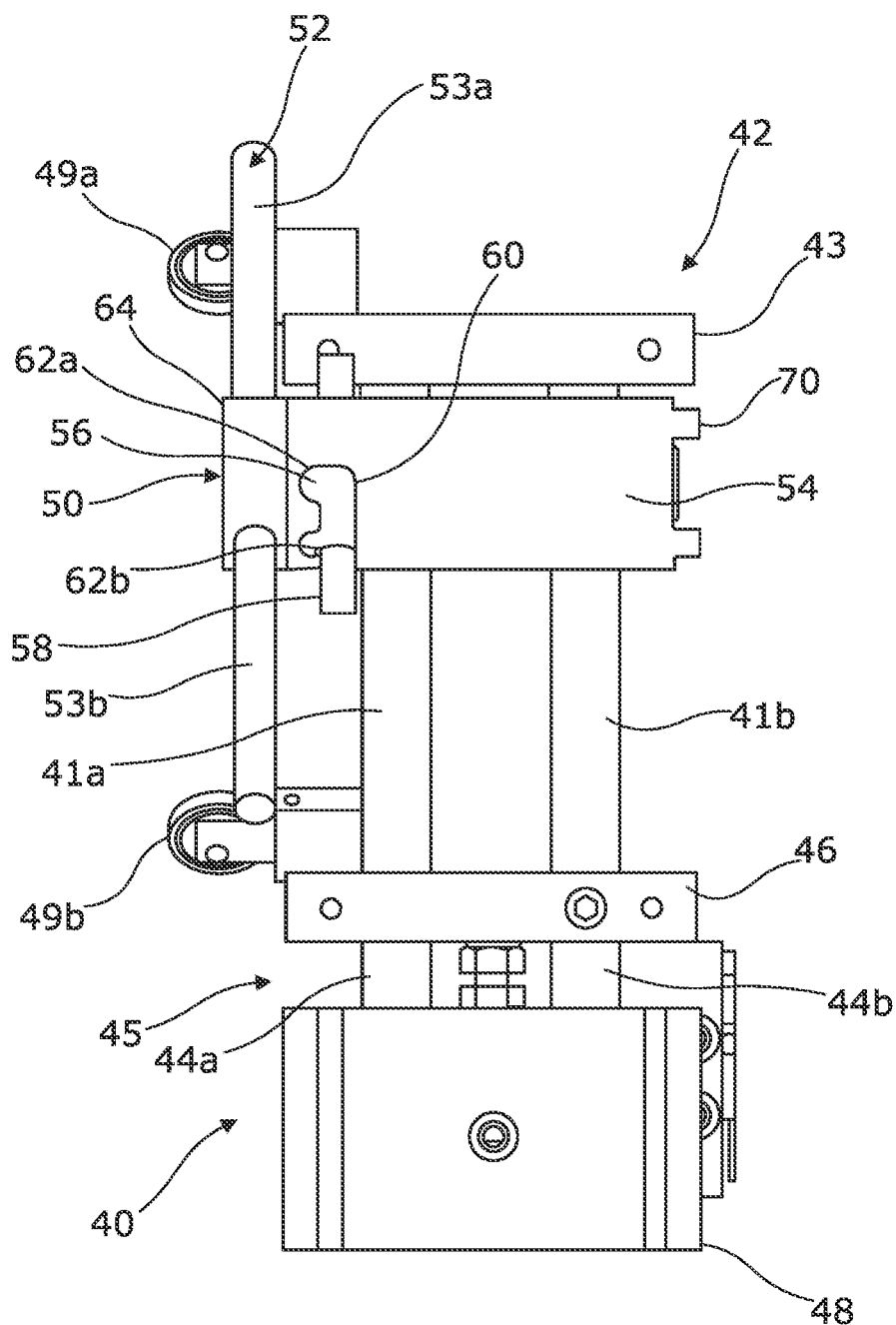
FIG. 6 is a side view of an embodiment of an operating handle.
Figure 8:
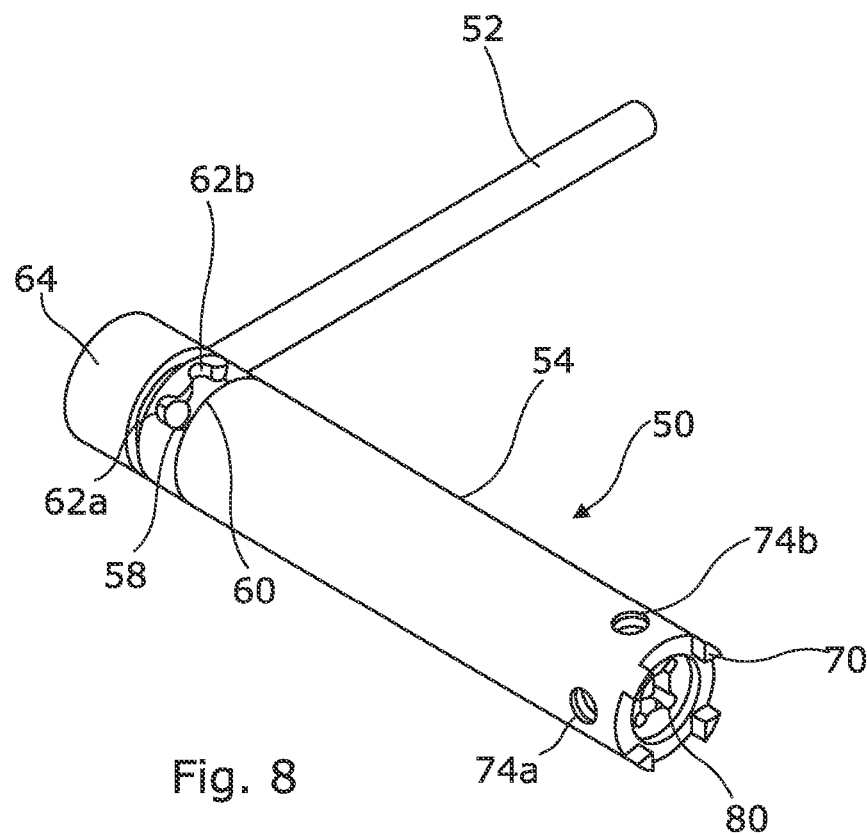
FIG. 8 is a perspective view of another embodiment of an operating handle.
Figure 9:
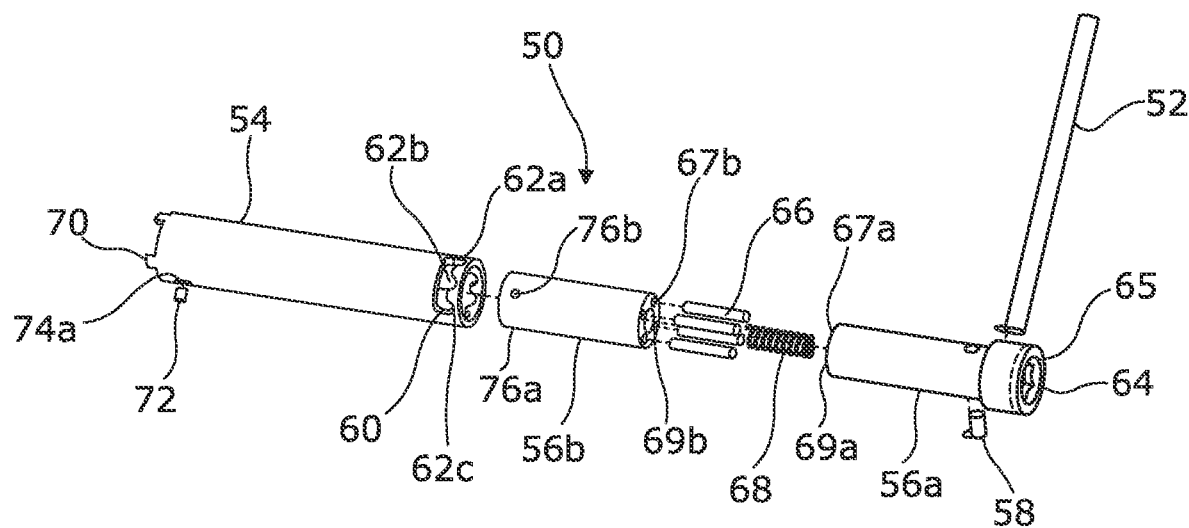
FIG. 9 is an exploded view of the operating handle shown in FIG. 8.

The first and second rollers 49a, 49b are configured to cause linear movement of the lever 52 from a first linear position to a second linear position when the first and/or second roller 49a, 49b is brought into contact with the respective lever arm 53a, 53b—i.e. upon movement of the respective piston 42, 45 from a retracted position to a first position. This linear movement of the lever 52 is necessary to disengage a rotation retention mechanism which otherwise prevents rotation of the lever 52. As is shown in FIG. 6 (and discussed in detail below with reference to FIGS. 8-11B), the operating handle 50 includes an outer sheath 54 within which the rotatable shaft 56 is received. The sheath 54 includes a slot 60 which is configured to receive a projecting portion 58 associated with the shaft 56. The slot 60 includes a series of notches 62a, 62b, 62c defining rotational positions of the lever 52 and hence shaft 56 of the operating handle 50. The projecting portion 58 is configured to move along the slot 60 in the outer sheath 54 upon rotation of the lever 52 and corresponding rotation of the shaft 56. With the lever 52 in its first linear position, the projecting portion 58 may be received within one of the notches 62a, 62b, 62c thereby preventing rotation of the shaft 56 under the operation of the lever 52. Accordingly, moving the lever 52 to its second linear position (e.g. by bringing the roller 49a or 49b into contact with respective lever arms 53a, 53b of the lever 52) is necessary to cause the projecting portion 58 to move out of contact with one of the notches 62a, 62b, 62c thereby allowing the shaft 56 to be rotated under movement of the lever 52.

The roller 49a and lever 52 are configured such that upon movement of the first piston 42 from its first position to its second position, and hence rotating the lever 52 from its first rotational position to its second rotational position, the first lever arm 53a moves out of contact with the roller 49a. This allows the lever 52 to move linearly from its second linear position to its first linear position (e.g. under the operation of a biasing member—see below) to re-engage the rotation retention mechanism to prevent further rotation of the lever 52. In this way, the lever 52 may be retained in its second rotational position following actuation by the first piston 42. Specifically, this is achieved by angling the roller 49a with respect to the lever 52 such that, with the first piston 42 in its first position and the lever in its first rotational position, the roller 49a is positioned perpendicular to the longitudinal axis of the first lever arm 53a. As the first piston 42 is moved to its second position, moving the lever 52 through an angle of 90° to its second rotational position, the roller 49a is moved to a position whereby it is positioned parallel longitudinal axis of the first lever arm 53a, thus moving the lever arm 53a out of contact with the roller 49a.

Roller 49b is configured in the same way. Specifically, roller 49b is configured such that upon movement of the second piston 45 from its first position to its second position, and hence rotating the lever 52 from its second rotational position to its first rotational position, the second lever arm 53b moves out of contact with the roller 49b. This allows the lever 52 to move linearly from its second linear position to its first linear position (e.g. under the operation of a biasing member—see below) to re-engage the rotation retention mechanism to prevent further rotation of the lever 52. In this way, the lever 52 may be retained in its first rotational position following actuation by the second piston 45. Specifically, this is achieved by angling the roller 49b with respect to the lever 52 such that, with the second piston 45 in its first position and the lever 52 in its second rotational position, the roller 49b is positioned perpendicular to the longitudinal axis of the second lever arm 53b. As the second piston 45 is moved to its second position, moving the lever 52 through an angle of 90° to its first rotational position, the roller 49b is moved to a position whereby it is positioned parallel longitudinal axis of the second lever arm 53b, thus moving the lever arm 53b out of contact with the roller 49b.

FIGS. 8-11B illustrate a variant of the operating handle 50 shown in the preceding Figures. Except where explicitly identified below, the operating handle 50 shown in FIGS. 8-11B is substantially identical in configuration to the operating handle 50 shown in the preceding Figures. Accordingly, unless otherwise stated, the following description further details the configuration of the operating handle 50 shown and described above.

As discussed herein, the operating handle 50 is configured, in use, to control operation of an outlet valve (not shown) of the valve arrangement 26 for controlling flow of a manufacturing material out of the outlet 16 of the hopper 12. The operating handle 50 includes a lever 52, a rotatable shaft 56 which includes first and second shaft portions 56a, 56b, and an outer sheath 54 in which the rotatable shaft 56 is located. The first shaft portion 56a is connected to the lever 52 such that rotation of the lever 52 causes a corresponding rotation of the shaft 56 which in turn acts on the outlet valve (not shown) to control flow of the material out of the hopper 12. In the illustrated arrangement, a bore 80 is provided in the end of the shaft 56 which acts as a female coupling for interaction with a corresponding male coupling on the valve arrangement 26. When coupled, the rotation of the shaft 56 acts to effect a corresponding rotation in the male coupling of the valve arrangement 26 for opening and closing the outlet valve.

The lever 52 comprises a coupling portion 64 and is coupled to the first shaft portion 56a (e.g. integrally formed with or suitably connected to) the first shaft portion 56a via the coupling portion 64. The coupling portion 64 itself is integrally formed with or suitably connected to the remainder of the lever 52, as will be appreciated.

At an end of the outer sheath 54, specifically the opposing end of the sheath 54 to the lever 52, the sheath 54 includes connection points 70 for connecting and securing the operating handle 50 to a valve arrangement 26 on the hopper 12 of the docking arrangement 10. Further, at this end of the sheath 54, apertures 74a, 74b are provided for receiving screws 72 for securing the second shaft portion 56b at the appropriate position within the sheath 54. The apertures may comprise a threaded surface for interacting with the screws 72. Corresponding (threaded) apertures 76a, 76b are provided at the end of the second shaft portion 56b.

First and second shaft portions 56a, 56b are operatively coupled via rods 66 which are configured to be located in corresponding slots 67a, 67b in first and second shaft portions 56a, 56b. The rods 66 provide an interface between the first and second shaft portions 56a, 56b ensuring that the second shaft portion 56b rotates with the first shaft portion 56a upon rotation of the lever 52 (e.g. through operation of an actuator).

The length of slots 67a, 67b is sufficiently large enough to allow a corresponding rod 66 to move within the slots 67a, 67b, e.g. such that the first shaft portion 56a may be moved axially with respect to the second shaft portion 56b between first and second axial positions along an axis running substantially centrally along the length of the shaft 56. In use, the first shaft portion 56a moves between first and second axial positions upon linear movement of the lever 52, which may be moved manually or under the operation of an actuator (e.g. actuator 40) as discussed herein.

Equally, the length of the slots 67a, 67b is sufficiently small such that at least a portion of a corresponding rod 66 is received within each opposing slot 67a, 67b with the first shaft portion 56a in either its first or second axial position such that the first shaft portion 56a and second shaft portion 56b remains operatively coupled at all times. This ensures that the first and second shaft portions 56a, 56b cannot rotate independently.

Figure 10A:
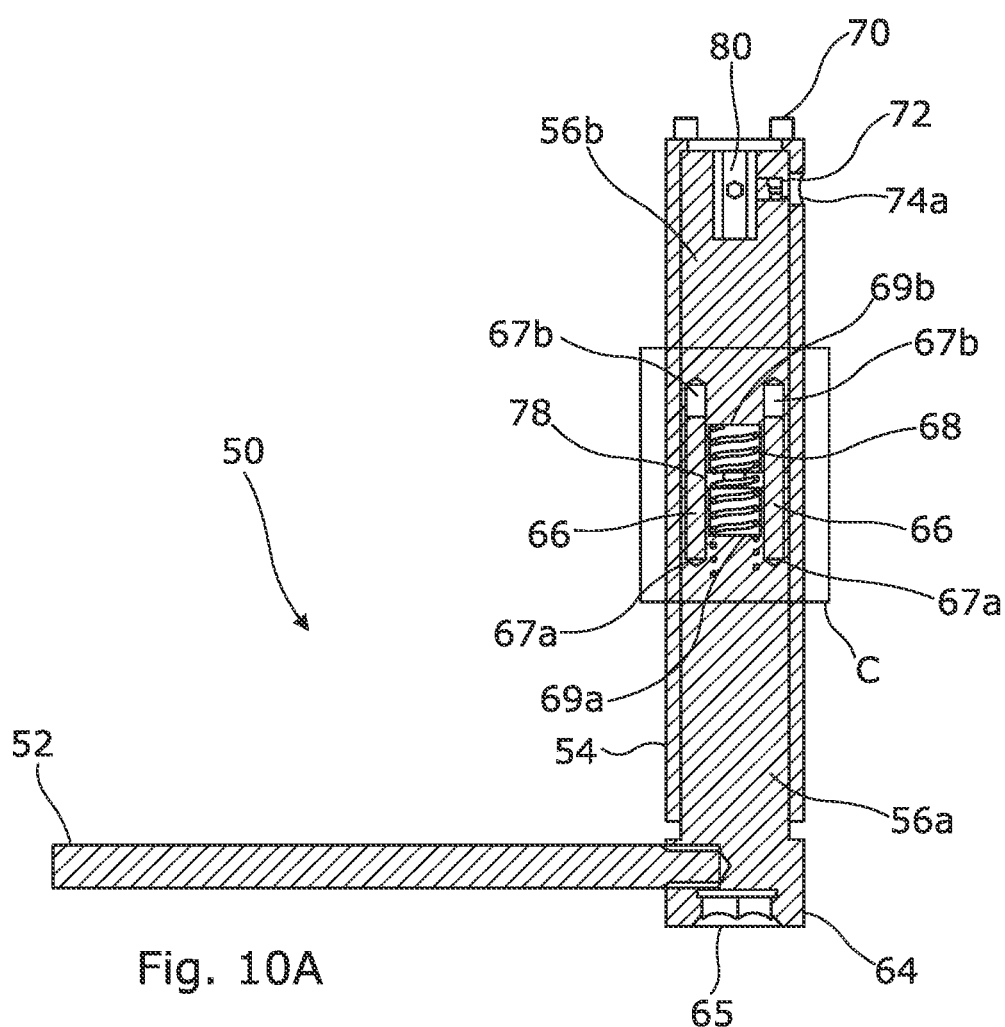
FIG. 10A is a cross-sectional view of the operating handle of FIGS. 8 and 9 in one state.
Figure 10B:
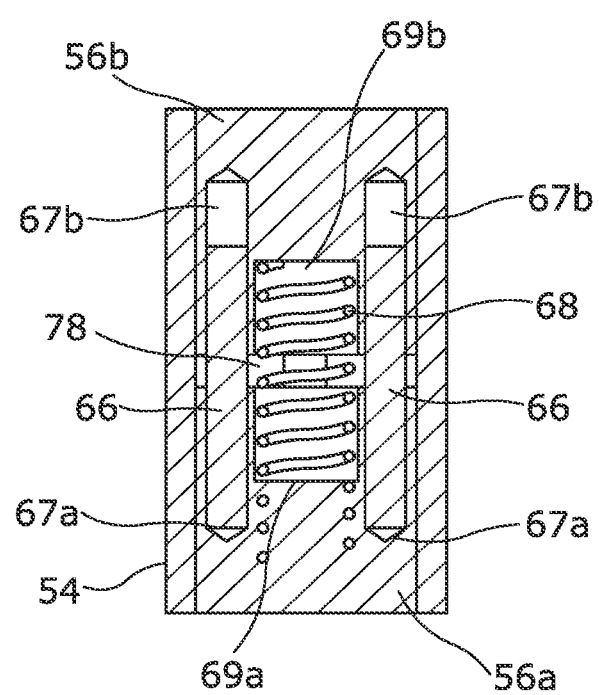
FIG. 10B is an enlargement of region C of FIG. 10A.
Figure 11A:
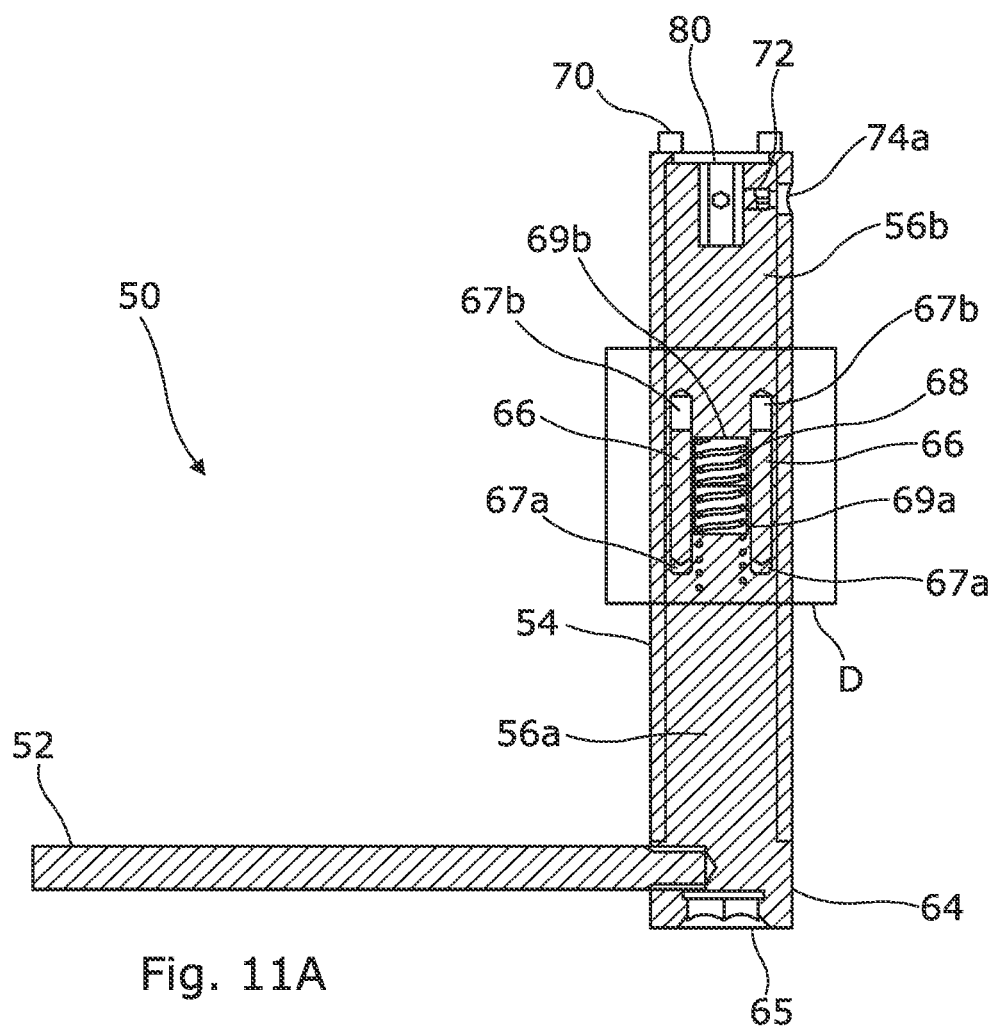
FIG. 11A is a cross-sectional view of the operating handle of FIGS. 8 and 9 in another state.
Figure 11B:
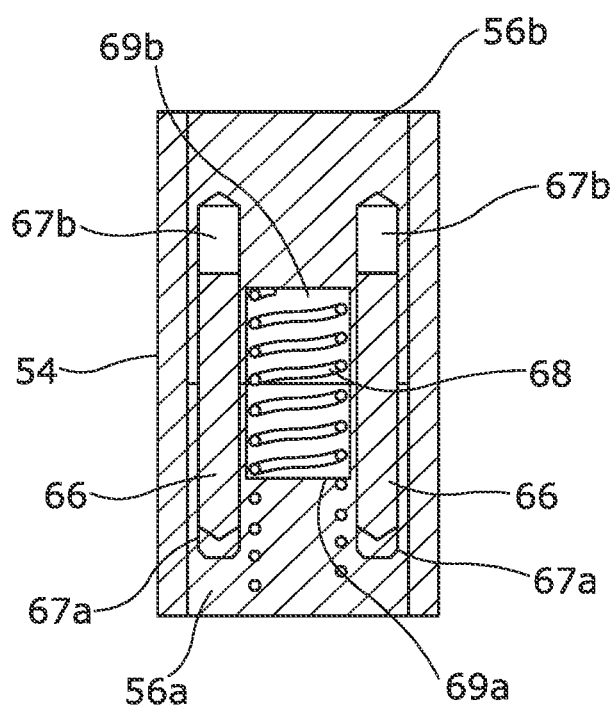
FIG. 11B is an enlargement of region D of FIG. 11A.
Figure 12:
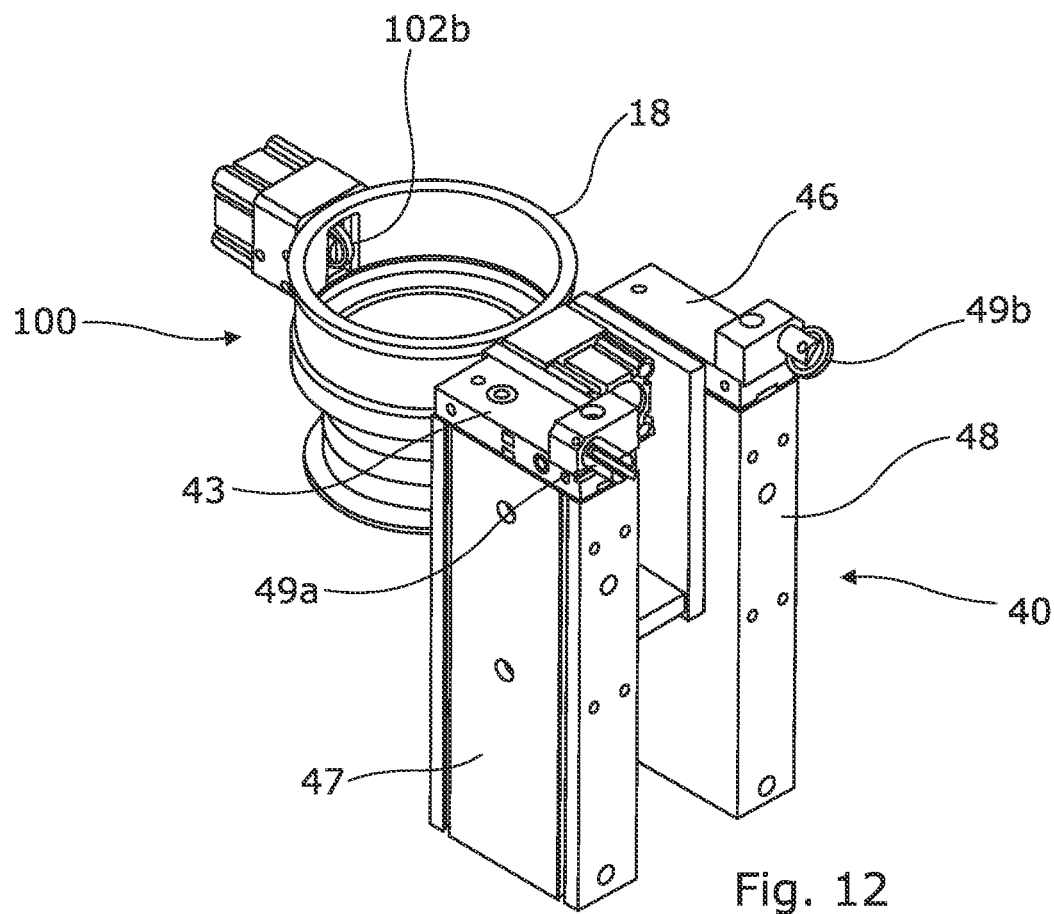
FIG. 12 is a perspective view of an embodiment of a locking mechanism.

In its first axial position, the first shaft portion 56a is separate from the second shaft portion 56b with a gap 78 therebetween (see FIGS. 10A & 10B). In its second axial position, the first shaft portion 56a is brought proximal to the second shaft portion 56b substantially eliminating any gap 78 therebetween (see FIGS. 11A & 11B).

First and second shaft portions 56a, 56b are additionally operatively coupled via a biasing member in the form of spring 68 located at either end in respective bores 69a, 69b in the first and second shaft portions 56a, 56b. The spring 68 is configured to provide a biasing force which acts with or against movement of the first shaft portion 56a between its first and second axial positions. In the illustrated embodiment, the biasing force provided by the spring 68 acts against movement of the first shaft portion 56a from its first axial position to its second axial position. Equally, the biasing force provided by the spring 69 acts with movement of the first shaft portion 56b from its second axial position to its first axial position. In this way, the biasing force acts to urge/retain the first shaft portion 56a to its first axial position unless acted on—e.g. via interaction of a user or an actuator with the lever 52 or other component of the operating handle 50.

Configuring the shaft 56 in this manner ensures that both first and second shaft portions 56a, 56b rotate together, but allows for the second shaft portion 56b to remain substantially stationary in an axial direction—for example, with respect to the outlet valve (not shown) such that it remains operatively coupled to the outlet valve at all times—and for the first shaft portion 56a to move relative to the second shaft portion 56b in an axial direction as may be required—for example, to engage/disengage a rotation retention mechanism as discussed herein.

As discussed briefly above, the operating handle 50 includes a rotation retention mechanism for retaining the lever 52 and hence shaft 56 in one of a plurality of rotational positions as may be required. Specifically, the outer sheath 54 includes a slot 60 which is configured to receive a projecting portion 58 associated with the first shaft portion 56a. The projecting portion 58 is configured to move along the slot 60 in the outer sheath 54 upon rotation of the lever 52 and corresponding rotation of the shaft 56. In the illustrated embodiment, the projecting portion 58 takes the form of a dowel suitably located and secured within an opening in the first shaft portion 56a and projecting from an exterior surface of the first shaft portion 56a.

The slot 60 includes a number of notches 62a, 62b, 62c for receiving the projecting portion 58. Notches 62a, 62b, 62c act to prevent rotation of the shaft 56 by retaining the projecting portion 58. In effect, the notches 62a, 62b, 62c define three angular positions in which the shaft 56 and lever 52 can be retained. Notch 62a corresponds to the first rotational position of the lever 52, notch 62c corresponds to the second rotational position of the lever 52, whilst notch 52b corresponds to an intermediate rotational position of the lever 52 between the first and second rotational positions. Accordingly, the notches 62a, 62b, 62c correspond to three operational states of the outlet valve (not shown), e.g. a fully closed, an intermediate and a fully open state for controlling flow of the manufacturing material.

The first shaft portion 56a, and hence the shaft 56 as a whole, is able to be rotated when the first shaft portion 56a is in its second axial position. Similarly, the first shaft portion, and hence the shaft 56, is unable to be rotated when the first shaft portion 56b is in its first axial position as a result of contact between the projecting portion 58 and one of the notches 62a, 62b, 62c in the slot 60. Providing the spring 68 ensures that unless the handle 50 is acted on (by a user or by an actuator) the first shaft portion 56a is held in its first axial position with the projecting portion 58 retained in contact with one of the notches 62a, 62b, 62c preventing rotation of the shaft 56. In order to rotate the shaft 56—i.e. to open/close the associated outlet valve—the first shaft portion 56a must be moved against the biasing force provided by the spring 68 to its second axial position (e.g. through linear movement of the lever 52), thereby disengaging the projecting portion 58 from the notch 62a, 62b, 62c. This in turn allows the projecting portion 58 to be moved along the slot 60—i.e. upon rotation of the shaft 56. After the shaft 56 is rotated to its desired angular position (corresponding to an associated operational state of the outlet valve) any external force applied to the first shaft portion 56a, e.g. by a user acting on the lever 52 or via an actuator, may be released, and the spring 68 acts to urge the first shaft portion 56a back to its first axial position with the projecting portion 58 engaged with a corresponding notch 62a, 62b, 62c in the slot 60 and the rotational position of the lever 52 and shaft 56 retained.

In the variant shown in FIGS. 8-11B, the lever 52 is pivoted about the operating handle 50 at an end thereof rather than at its centre as is the case with the operating handle 50 shown in the preceding Figures. Accordingly, the configuration of the actuator 40 may be unsuitable for use with this variant. Accordingly, in the variant shown in FIGS. 8-11B, the coupling portion 64 of the lever 52 includes a bore 65 which acts as a female coupling configured to receive a corresponding male coupling of an associated actuator (not shown). When coupled via the male/female coupling, the actuator may be configured to cause linear movement and/or rotation of the shaft 56—i.e. without a user manually acting on the lever 52. In this way, the arrangement provides an operating handle which may be controlled either manually or automatically without manual input as the situation may require. However, in this variant the actuator may have to be separately aligned with and coupled to the bore 65 following positioning of the hopper 12 with the dock 11. It may, however, be desirable to align the actuator with the operating handle upon docking of the hopper, as with the embodiment shown in FIGS. 1-7B.

In a further variant (not shown in the Figures), the operating handle may comprise a right angle drive type arrangement whereby a vertically oriented actuator (for example a vertical actuator drive shaft) may be received within a correspondingly oriented coupling on the operating handle upon docking of the hopper 12. In such an arrangement, the operating handle may include a gear arrangement, which could include a pair of bevel gears to effect corresponding rotation of a horizontally oriented drive shaft of the valve arrangement 26 under operation/rotation of the actuator.

In embodiments, the operating handle 50 may be specific to a type of material contained within the hopper 12. For instance, in the variant shown in FIGS. 8-11B, the bore 65 may include a configuration which is specific to the type of material contained within the hopper 12. Accordingly, a specifically configured actuator must be used to act on the operating handle 50 to open and close the associated outlet valve. The actuator may be associated with a certain component of the manufacturing process. In this way, the configuration of the operating handle 50 may be such that handle 50 may only be used (and material deposited from the hopper 50) for specific components within the manufacturing process. Accordingly, the operating handle 50 may be configured to prevent the wrong type of material being deposited at the wrong location or to the wrong component.

FIGS. 12-15B illustrate an embodiment of a locking mechanism 100 in accordance with the invention. The locking mechanism 100 is configured to couple and secure an outlet 16 of the hopper 12 to an inlet 18 of a further component of an additive manufacturing process, such as an additive manufacturing machine. Specifically, the locking arrangement 100 is provided with the inlet 18 and is positioned such that it may act on an external surface of the outlet 16 when the outlet 16 is received within an open upper end of the inlet 18.

Figure 13:
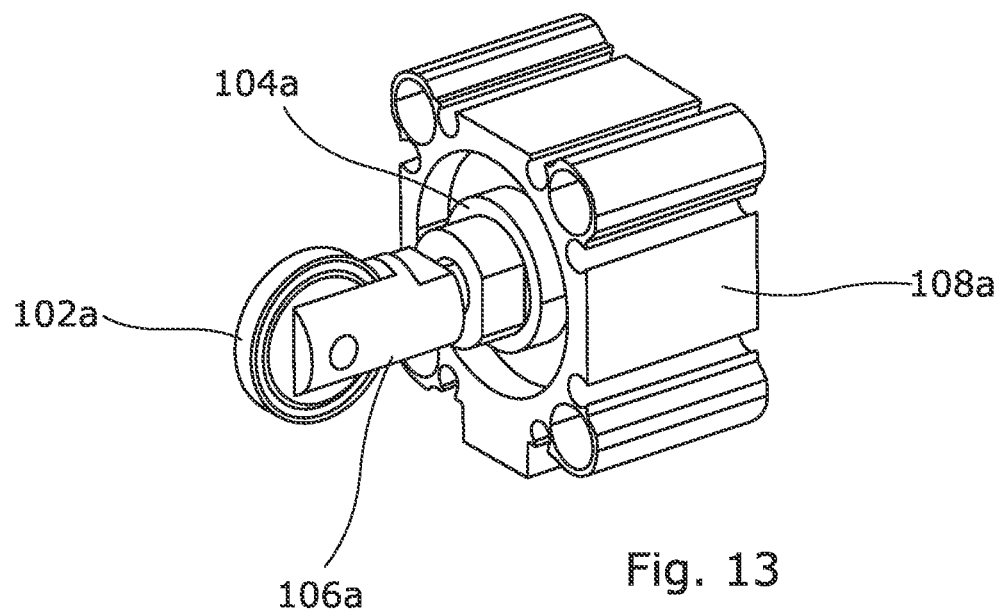
FIG. 13 is a perspective view of a component of the locking mechanism of FIG. 12.

The locking mechanism 100 includes a pair of opposing locking members in the form of rollers 102a, 102b which are moveable in a direction perpendicular to their rotation axis. In the orientation shown in the Figures, this comprises movement in a horizontal direction. Movement of the rollers 102a, 102b is controlled via respective linear actuators in the form of pistons 104a, 104b. The rollers 102a, 102b are mounted to respective pistons 104a, 104b via respective clevis-type fasteners 106a, 106b which allow rotational movement of the rollers 102a, 102b about respective rotation axes. This mounting arrangement is shown in FIG. 13. Alternatively, the rollers may include an outer collar which is rotationally mounted, for example by way of needle roller bearings, to the remainder of the roller.

Figure 14B:
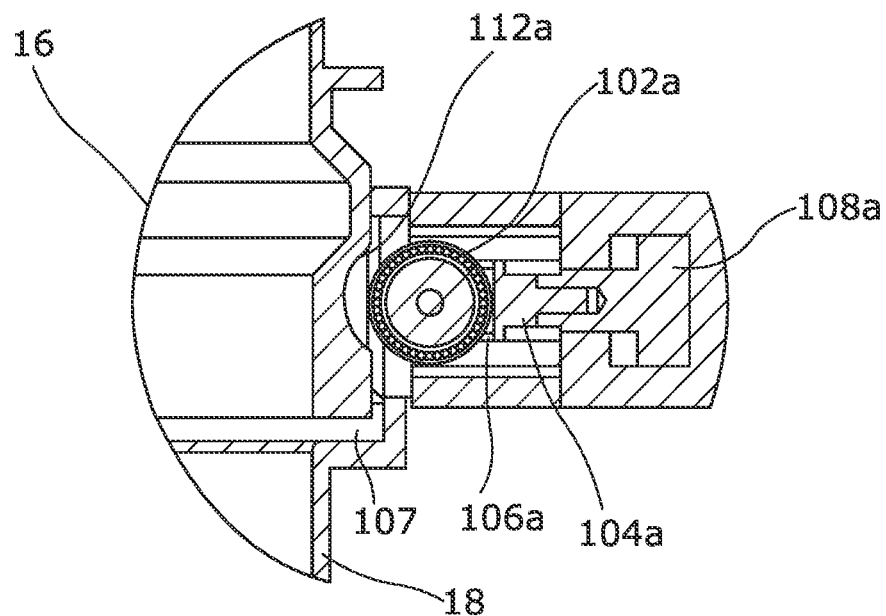
FIG. 14B is an enlargement of region E of FIG. 14A.

In use, the pistons 104a, 104b are configured to control movement of the respective rollers 102a, 102b between a first longitudinal position (as shown in FIGS. 14A and 14B) and a second longitudinal position (as shown in FIGS. 15A and 15B). In the illustrated embodiment, the first longitudinal position of the rollers 102a, 102b corresponds to an "unlocked" state of the locking mechanism 100 and the second longitudinal position corresponds to a "locked" state of the locking mechanism 100.

In alternative embodiments the rollers are mounted on an actuator other than a piston and cylinder device. This may be an electrical actuator, such as a solenoid.

The outlet 16 of the hopper 12 is provided with a groove 112 about an exterior surface thereof, depicted here by opposing groove sections 112a, 112b. The groove sections 112a, 112b correspond to respective rollers 102a, 102b. The groove 112 may be provided about the entire circumference of the outlet 16. In such embodiments, this may allow the hopper 12 to be secured within the docking arrangement 10 without requiring the hopper 12 to be positioned with the groove 112 precisely aligned with respective rollers 102a, 102b.

In use, the groove sections 112a, 112b are configured to receive at least part of respective rollers 102a, 102b to secure the outlet 16 of the hopper 12 to the inlet 18. Specifically, the process of coupling and securing the outlet 16 and inlet 18 begins with the rollers 102a, 102b provided in the first longitudinal position. With the rollers 102a, 102b in the first longitudinal position, the outlet 16 of the hopper 12 is able to be brought proximal and preferably into contact with the inlet 18. In the illustrated embodiment, the outlet 16 is positioned within a recess 107 within the open end of the inlet 18 as shown in FIGS. 14A and 14B. With the outlet 16 in this position, the rollers 102a, 102b are moved to the second longitudinal position (as shown in FIGS. 15A and 15B) under the operation of respective pistons 104a, 104b. When in the second longitudinal position the rollers 102a, 102b are at least partly received in the groove 112, specifically in corresponding groove sections 112a, 112b in the exterior wall of the outlet 16 preventing the outlet 16 from being withdrawn from the recess 107 in the inlet 18. In this way, the locking mechanism 100 may be used to couple and secure the outlet 16 to the inlet 18.

Pistons 104a, 104b are controlled pneumatically through the introduction and/or removal of gas from within respective piston chambers 108a, 108b. The gas is supplied and/or removed from piston chambers 108a, 108b via respective supply pipes 110a, 110b. As will be appreciated, introduction of gas into the piston chambers 108a, 108b will cause the pistons to move inwardly (in the configuration shown in the Figures) and hence cause the rollers 102a, 102b to move to the second longitudinal position. Removal of gas from within the piston chambers 108a, 108b will cause the pistons to move outwardly (in the configuration shown in the Figures) and hence cause the rollers 102a, 102b to move to the first longitudinal position.

Locking and unlocking of the locking mechanism 100 may preferably be controlled centrally via a control system (not shown). The central control system may also take into account other operational states of components of the docking arrangement 10 in controlling operation of the locking mechanism 100. For example, the central control system may require that the outlet valve of the valve arrangement 26 be in a closed state before allowing/controlling the locking mechanism 100 to unlock. Equally, the central control system may be configured to prevent opening of the outlet valve of the valve arrangement 26 unless the locking mechanism 100 is locked with the outlet 16 and inlet 18 coupled and secured in position.

An alternative locking mechanism 100' is shown in FIGS. 16 and 17.

The locking mechanism 100' includes a pair of locking members in the form of cams 102a', 102b', rotatably mounted at respective primary pivot points 109a', 109b'. In use, rotation of the cams 102a', 102b' about the respective primary pivot points 109a', 109b' causes the cams 102a', 102b' to move into and out of the interior of inlet 18 to between locked and unlocked positions to engage and disengage with the outlet 16 of the hopper 12 in a similar fashion to rollers 102a, 102b shown in the preceding Figures.

The cams 102a', 102b' are additionally rotatably mounted at ends thereof to respective linear actuators in the form of pistons 104a', 104b' via secondary pivot points 107a', 107b'. In use, movement of the cams 102a', 102b' is controlled via the pistons 104a', 104b' as described herein. Specifically, the pistons 104a', 104b' are configured to control movement of the respective cams 102a', 102b' between a first rotational position corresponding to an "unlocked" state of the locking mechanism 100' and a second rotational position corresponding to a "locked" state of the locking mechanism 100'. In the unlocked state, the cams 102a', 102b' are positioned substantially out of the interior of the inlet 18 (as shown in FIG. 17). In the locked state, the cams 102a', 102b' project into the interior of the inlet 18 to engage an exterior surface (e.g. a groove 112) of a corresponding outlet 16 of a hopper 12 as discussed above.

As will be appreciated, pistons 104a', 104b' may be controlled pneumatically through the introduction and/or removal of gas from within respective piston chambers 108a', 108'b. The gas is supplied and/or removed from piston chambers 108a', 108b' via respective supply pipes 110a', 110b'.

Introduction of gas into the piston chambers 108a', 108b' causes the pistons to move upwardly (in the configuration shown in the Figures) and hence cause the cams 102a', 102b' to rotate about respective primary pivot points 109a', 109b' from a first rotational position to a second rotational position. Conversely, removal of gas from within the piston chambers 108a', 108b' will cause the pistons 108a', 108b' to move downwardly (in the configuration shown in the Figures) and hence cause the cams 102a', 102b' to rotate about respective primary pivot points 109a', 109b' in the opposite sense from a second rotational position to a first rotational position.

In the illustrated embodiment, cams 102a', 102b' are "over-centre" cams. Rotation of the cams 102a', 102b' about respective primary pivot points 109a', 109b' past the horizontal—i.e. past where the primary pivot points 109a', 109b' are horizontally aligned with respective secondary pivot points 107a', 107b'—effectively locks the cams 102a', 102b' in place when in respective second rotational positions unless otherwise acted on by respective pistons 104a', 104b'. Specifically, this prevents any internal force/pressure on the cams 102a', 102b', e.g. by the outlet 16 of the hopper 12 from unintentionally "unlocking" the locking mechanism 100', in use.

As with locking mechanism 100, locking and unlocking of the locking mechanism 100' may preferably be controlled centrally via a control system (not shown). Again, the central control system may also take into account other operational states of components of the docking arrangement 10 in controlling operation of the locking mechanism 100'.

An example control strategy 200 of a central control system is shown in the flowchart of FIGS. 18A and 18B. Where applicable, FIGS. 18A and 18B include representations showing the operational state of the locking mechanism 100 and operating handle 50/actuator 40 arrangement at each step of the control strategy 200.

FIG. 18A illustrates a first part of the control strategy 200 which includes securing the hopper 12 on the dock 11 and subsequently opening the valve arrangement 26 to allow material within the hopper 12 to be delivered to the associated further component of the manufacturing process.

Specifically, at 202, the locking mechanism 100 is provided in an open configuration. That is, the rollers 102a, 102b are retained in respective first longitudinal positions allowing an outlet 16 of the hopper 12 to be brought into position with respect to the inlet 18 of the dock 11 as described herein. At this step, the first and second pistons 42, 45 of the actuator 40 are retained in a retracted position with rollers 49a, 49b out of contact with respective lever arms 53a, 53b. The lever 52 is provided in its first rotational position, as shown, which corresponds to a closed configuration of the associated valve arrangement 26.

At 204, a check is performed to confirm that the outlet 16 of the hopper 12 is positioned within the inlet 18 of the dock 11. If not, the locking mechanism 100 remains in the open configuration.

Once the outlet 16 of the hopper 12 is in position within the inlet 18, the locking mechanism 100 may be closed at step 206. As discussed herein, closing the locking mechanism 100 includes powering pistons 104a, 104b to move respective rollers 102a, 102b to second longitudinal positions and specifically into contact with respective groove sections 112a, 112b within the exterior surface of the outlet 16. During this step, the first and second pistons 42, 45 are retained in respective retracted positions.

At steps 208 & 210 a pressure check is performed to confirm that a sealed connection has been formed between the outlet 16 and inlet 18. If not, the process returns to step 202 where the locking mechanism 100 may be opened to repeat the locking process of steps 202 to 206.

Once a sealed connection is confirmed, pistons 42, 45 are powered to respective first positions at step 212. Specifically, roller 49a associated with piston 42 is brought into contact with the first lever arm 53a of the lever 52 thereby depressing the lever 52 to disengage the rotation retention mechanism.

At step 214, piston 42 is powered to its second position thereby rotating the lever 52 and hence shaft 56 of the operating handle 50 through an angle of 90° to its second rotational position, as shown. The second rotational position of the lever 52 corresponds to an open configuration of the valve arrangement 26, thereby allowing material from the hopper 12 to exit through the outlet 16 into the further component of the manufacturing process via inlet 18.

Once a desired amount of material has been removed from the hopper 12, a reverse process may be performed to close the valve arrangement 26 and unlock the locking mechanism 100 thereby allowing the hopper 12 to be removed from the dock 11. This is shown in FIG. 18B.

At step 216, the second piston 45 is powered to its second position causing the roller 49b to act on the second lever arm 53b of the lever 52 thereby causing the lever 52 to rotate through an angle of 90° back to its first rotational position. In doing so, the valve arrangement 26 may be closed preventing any more material from leaving the hopper 12.

At step 218, both the first and second pistons 42, 45 are moved back to retracted positions whereby the rollers 49a, 49b are brought out of contact with respective lever arms 53a, 53b. In doing so, the lever 52 is free to move under the bias provided by spring 68 to engage the rotation retention mechanism to secure the lever 52 in its first rotational position (with the valve arrangement 26 closed).

At step 220, a check is performed to confirm that the valve arrangement 26 has been closed. If not, the process returns to step 216 to repeat the steps 216 and 218 to close the valve arrangement 26.

Once the valve arrangement 26 is confirmed to have been closed, the process continues to step 222 where the locking mechanism 100 may be opened. Specifically, pistons 104a, 104b are powered to move respective rollers 102a, 102b to first longitudinal positions and specifically out of contact with respective groove sections 112a, 112b within the exterior surface of the outlet 16. This releases the hopper 12 from the dock 11 allowing it to be removed.

FIGS. 19 and 20 illustrate a further feature of the docking arrangement 10. Specifically, these figures illustrate the operational use of the gas inlet 32. As shown, a gas supply unit 34 is coupled to the gas inlet 32 and is connected via a gas supply line 33 to a gas supply 35 associated with the dock 11. To effect this coupling, supply pipes 36a, 36b of the supply line are coupled via couplers 38a, 38b to respective couplers 37a, 37b on the dock 11.

The gas provided by the gas supply may in some instances comprise air, but may equally comprise a specific type of gas as required by the material contained within the hopper 12. As discussed herein, some materials may oxidise in air so must be kept under a controlled atmosphere. Accordingly, the gas supply 35 may comprise an inert gas (e.g. argon, nitrogen, etc.) which may suitably inhibit oxidation or other deterioration of the material within the hopper 12.

In a further use case, the gas supply 35 provides a source of gas to the hopper 12 for controlling a pressure level within the hopper 12 to assist in the flow of material from the outlet 16 of the hopper 12. The hopper 12 can additionally include a gas outlet (not shown) which may act as a bleed valve to ensure the pressure level inside the container 14 remains at a desired level, or below an acceptable maximum pressure level, for example. This enables gas to be bled from the hopper 12 enabling the gas supply 35 to be used to purge the hopper 12 of gas it contains, replacing it with gas from the gas supply 35.

The gas supply unit 34 can include one or more pressure sensors for monitoring the pressure within the hopper 12, and control the supply of gas to the hopper 12 based on the monitored pressure level. Operation of the gas supply unit 34 can be controlled by a control system (not shown).

In further embodiments, the gas supply 35 can be coupled to a gas inlet (not shown) at an interface between the outlet 16 of the hopper 12 and the inlet 18 on the dock 11. In such embodiments, the gas supply 35 can be used to purge the interface between the hopper 12 and the component of the manufacturing process to prevent deterioration of the material when it is being transferred to the component.

The one or more embodiments are described above by way of example only. Many variations are possible without departing from the scope of protection afforded by the appended claims.

The invention claimed is:

1. An operating handle for controlling the operational state of a valve arrangement associated with a container to control dispensing of material from the container to a component of an additive manufacturing process, the operating handle comprising:
   a rotatable shaft coupled to the valve arrangement, the shaft being rotatable between a plurality of angular positions corresponding one or more operational states of the valve arrangement; and
   a lever operatively coupled to the shaft and configured to cause rotation of the shaft between the plurality of angular positions upon rotation of the lever;
   wherein the handle is rotatable under the operation of an actuator provided as part of a docking arrangement associated with the component, and wherein the handle is configured such that the lever is acted on directly by one or more components of the actuator.

2. An operating handle as claimed in claim 1, wherein the lever is operatively coupled to the rotatable shaft via a coupling portion provided approximately half way along the length of the lever, thereby defining first and second lever arms of the lever provided either side of the coupling portion.

3. An operating handle as claimed in claim 1 wherein the lever and the rotatable shaft are rotatable between first and second rotational positions, the first and second rotational positions corresponding to a fully closed and fully open configuration of the associated valve arrangement.

4. An operating handle as claimed in claim 3, wherein the lever is rotatable between first and second rotational positions via an intermediate position provided between the first and second rotational positions, the intermediate position corresponding to a partly open configuration of the valve arrangement.

5. An operating handle as claimed in claim 1, wherein the rotatable shaft comprises first and second shaft portions, and wherein the first shaft portion is coupled to the lever and the second shaft portion is configured to be coupled, in use, to the valve arrangement.

6. An operating handle as claimed in claim 5, wherein the first and second shaft portions are operatively coupled.

7. An operating handle as claimed in claim 5, wherein the first shaft portion is moveable in an axial direction between first and second axial positions under the operation of the lever.

8. An operating handle as claimed in claim 5, comprising a biasing member configured to provide a biasing force which acts with or against movement of the first shaft portion relative to the second shaft portion.

9. An operating handle as claimed in claim 1, comprising a rotation retention mechanism configured to retain the lever hence the rotatable shaft in one of a plurality of rotational positions.

10. An operating handle as claimed in claim 9,
wherein the rotatable shaft comprises first and second shaft portions, and wherein the first shaft portion is coupled to the lever and the second shaft portion is configured to be coupled, in use, to the valve arrangement,
wherein the rotation retention mechanism is configured to:
retain the lever and rotatable shaft in given rotational position when the first shaft portion is in a first axial position; and
allow rotation of the lever and rotatable shaft between a plurality of rotational positions when the first shaft portion is in a second axial position.

11. An operating handle as claimed in claim 9, comprising a slot provided within an outer sheath provided about the rotatable shaft, wherein the slot is configured to receive a projecting portion associated with the rotatable shaft.

12. An operating handle as claimed in claim 11, wherein the slot in the outer sheath comprises a plurality of notches for receiving the projecting portion, the plurality of notches being configured to act to prevent rotation of the shaft by retaining the projecting portion therein.

13. The operating handle of claim 1, comprising coupling means for coupling the operating handle to the actuator, in use.

14. An operating handle as claimed in claim 13, wherein the coupling means comprises a female coupling provided by a component of the operating handle for receiving a corresponding male coupling provided by the actuator.

15. An operating handle as claimed in claim 1, comprising a gear arrangement configured to effect corresponding rotation of a horizontally oriented drive shaft of the valve arrangement under rotation of a vertically oriented drive shaft of the actuator.

16. An operating handle as claimed in claim 13, wherein the female coupling is specific to a type of material held within the container such that a specifically configured actuator must be used to act on the operating handle in order to open and close the associated valve arrangement.

17. An actuator for controlling the operational state of a valve arrangement associated with a container to control dispensing of material from the container to a component of an additive manufacturing process, wherein:
the actuator is provided as part of a docking arrangement associated with the component;
the actuator comprises at least one moveable component configured to be coupled with an operating handle of any preceding claim; and
the at least one moveable component is operable, in use, to act directly on the lever to cause rotation of the lever to control the operational state of the valve arrangement.

18. An actuator as claimed in claim 17, wherein the at least one moveable component is moveable linearly.

19. An actuator as claimed in claim 18, wherein the moveable component comprises an end portion forming a contact surface for contacting the lever to cause rotation thereof, and wherein the end portion comprises a roller with a contact surface which is a rotatable about a central axis.

20. An actuator as claimed in claim 17, wherein the actuator is a linear actuator.

21. An actuator as claimed in claim 17, wherein at least one moveable component of the actuator comprises a rotatable drive shaft configured as a coupling part to be received by a corresponding coupling provided by the operating handle.

22. A docking arrangement for an additive manufacturing process, the docking arrangement comprising an operating handle as claimed in claim 1; and an actuator.

23. A method of controlling the operational state of a valve arrangement associated with a container to control dispensing of material from the container to a component of an additive manufacturing process using a docking arrangement as claimed in claim 22, the method comprising:
coupling an outlet of the container to an inlet of a dock associated with the component of the additive manufacturing process; and
rotating the lever under the operation of the actuator to open the valve arrangement to dispense material from the container to the component, wherein the lever is rotated by the actuator acting directly on the lever.

* * * * *